(12) United States Patent
Karmouch et al.

(10) Patent No.: US 7,240,015 B1
(45) Date of Patent: Jul. 3, 2007

(54) POLICY REPRESENTATIONS AND MECHANISMS FOR THE CONTROL OF SOFTWARE

(75) Inventors: Ahmed Karmouch, Gloucester (CA); Tom Gray, Carp (CA); Serge Mankovskii, Carp (CA); Mouheine Guennoun, Hull (CA)

(73) Assignee: Mitel Networks Corporation and The University of Ottawa (CA)

( * ) Notice: Subject to any disclaimer, the term of this patent is extended or adjusted under 35 U.S.C. 154(b) by 1387 days.

(21) Appl. No.: 09/663,026

(22) Filed: Sep. 15, 2000

(30) Foreign Application Priority Data

Sep. 17, 1999 (GB) ................................. 9922096.4

(51) Int. Cl.
*G06Q 40/00* (2006.01)
(52) U.S. Cl. .................... 705/4; 709/202; 709/203; 709/207; 709/217; 705/11
(58) Field of Classification Search ................ 705/11, 705/4; 709/202, 207, 203, 217, 224
See application file for complete search history.

(56) References Cited

U.S. PATENT DOCUMENTS 5,440,744 A * 8/1995 Jacobson et al. ........... 709/203
5,655,081 A * 8/1997 Bonnell et al. ............. 709/202
5,926,624 A * 7/1999 Katz et al. .................. 709/217
6,021,438 A * 2/2000 Duvvoori et al. ........... 709/224
6,263,362 B1 * 7/2001 Donoho et al. ............. 709/207

FOREIGN PATENT DOCUMENTS

WO           9729443           8/1997
WO     WO 03/036444 A2 *      5/2003

OTHER PUBLICATIONS

Mary Petrosky; Directories in the limelight; Network World; Framingham; Mar. 16, 1998; vol. 15; pp. 1-6.*

* cited by examiner

*Primary Examiner*—Zeender Ryan Florian
*Assistant Examiner*—Vanel Frenel
(74) *Attorney, Agent, or Firm*—Jones Day

(57) ABSTRACT

According to the present invention, an architecture of multiple agents is provided for setting up and enforcing policies within each site of a virtual network. A policy server represents the global policies of the site and each agent manages its own policies. Policies are dynamically downloaded from the policy server into agents that carry the responsibility to enforce them. Agents propagate their policies to the policy server to detect any conflict that may rise between agents during dynamic mapping and resource reservation. A negotiation mechanism is provided to resolve such conflicts. An authorization-based mechanism is also provided such that agents must request authorization before performing any action, in response to which a ticket is delivered to the requesting agent for accountability and security reasons.

14 Claims, 16 Drawing Sheets

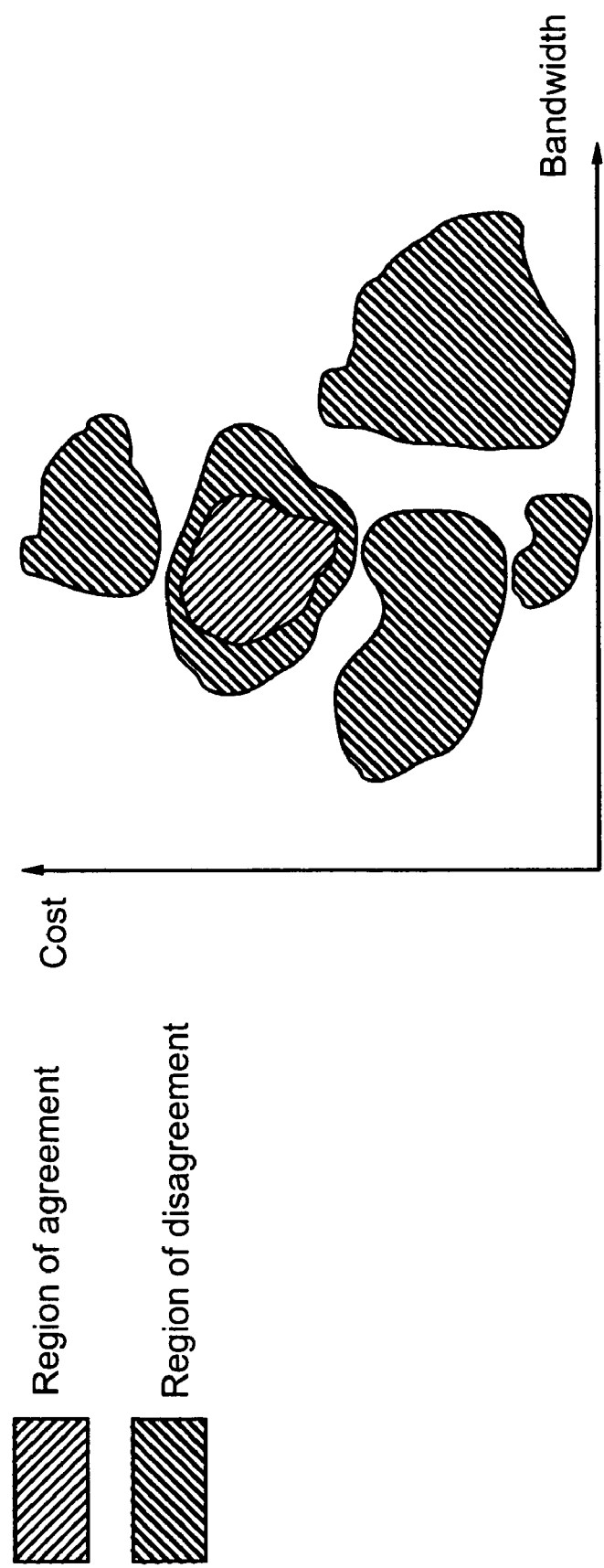

POLICY REPRESENTATIONS AND MECHANISMS FOR THE CONTROL OF SOFTWARE

FIELD OF THE INVENTION

This invention relates in general to communications systems, and more particularly to a method and apparatus for use of policies in the control of multi-enterprise software-based communications systems.

BACKGROUND OF THE INVENTION

The evolution towards the design of multimedia communications systems based on open standards has been ongoing since the 1980s. One example of such a system is the MediaPath™ communications server manufactured by Mitel Corporation. The MediaPath™ system comprises call control software which operates in conjunction with a plurality of server telecommunication boards (voice processing board, trunk board, line board, etc.), as described in http://www.mitel.com/MediaPath (1997).

Software agents have been used in such systems as autonomous entities that are able to act without referring to a main entity (see A. Karmouch, Mobile Software Agents for Telecommunications, IEEE Communications, July 1998). When spread over a network, these software entities require autonomy for obvious performance reasons. Agents are able to interact with each other and can manage conflicts that may occur between them as a result of these interactions. Furthermore, agents are able to react to changes that occur in their environments.

In R. Buhr, D. Amyot, M. Elammari, D. Quesnel, T. Gray, S. Mankovski, "Feature-Interaction Visualisation and Resolution in an Agent Environment", *Feature Interactions in Telecommunications and Software Systems V.*", K. Kimbler and L. G. Bouma, editors, IOS Press Amsterdam, The Netherlands, 1998, p. 135–149, a multi-agent architecture is set forth wherein each physical device is represented by a device agent that is responsible for handling and controlling all requests and actions of the device. The device agent may contain multiple feature agents, which are responsible for implementing the various features to which the device has subscribed. The end user may also be represented by a user-agent, which contains all of the preferences of the user.

Researchers have also utilized the principles of multi-agent architectures in designing distributed and federated multi-enterprise systems. One example of such a system is the Personal Mobility Management System designed and implemented by the Mobile Agent Alliance, which is a collaboration of the University of Ottawa, Mitel Corporation and the National Research Council of Canada. The Personal Mobility Management System (PMMS) provides personalized services and access to resources for nomadic users over a network. The system provides a nomadic user with a working environment, which is similar to his/her home environment. In the home site, a user has a profile that describes his/her preferences: the services he/she uses, the quality of service required, the cost he/she is willing to pay to use certain billable services, etc. A dynamic mapping between the user profile and the local policies on each site determines a set of services that a visiting site can offer to its guest. A nomadic user can be requested to pay a cost for services such as long distance calling. For example, in the instance in which the visiting site is a hotel, which has made arrangements with a guest's employers having regard to access to hotel facilities costs that the guest incurs in the use of services can be billed directly to the employer. Thus, it is desirable for the employer to be able to institute policies about which billable services are allowable. Hence, agent negotiation techniques are used between the home site and the visiting site in order to agree on the cost or to find a service that can fit the requirements of the user with a lower cost. Negotiation is also used for resource reservation when a user starts a service on a visiting site.

Very little research has been undertaken to date in the area of integrating policies and agents together. With the use of agents, real automated and policy driven management can be accomplished. The inventors have recognized that policies can be used to monitor agent behavior in specific situations and to ensure that such behavior is consistent with the global strategy of the system.

The term "policies" may be defined as a set of rules in a domain-managed object. These rules are derived from management goals and related business strategies to define the desired behavior of distributed heterogeneous systems, networks and applications. They provide means for expressing how tasks are to be undertaken and how a system is to respond to a given situation. Policies may also be defined as a binary relationship between objects. Binary relations, consisting of a subject and a target, can be used to express different types of policies. Management policies may be expressed by a human manager in a high level manner, i.e. policy language. These policies must then be transformed and refined into scripts or rules that can be interpreted by software agents (see D. Marriot, M. Sloman, Management Policy Service for Distributed Systems, IEEE $3^{rd}$ Int. Workshop on Services in Distributed and Network Environments, Macau, June 1996). Policies are expressed independently from the agents that interpret them. This separation permits modification of the policies without changing the code of the agents. Furthermore, agents can be reused in different networks where different policies apply.

Because of the large number of policies, classification systems have been developed to give semantics to the policies and to assist in automating the process of transforming and refining of the policies. The most important classes are set forth in R. Wies, Policy Definition and Classification: Aspects, Criteria and Examples, Proceeding of the IFIP, IEEE International Workshop on Distributed Systems: Operations & Management, Toulouse, France, 10–12 Oct. 1994, as follows:

Mode: Policies can be an obligation, permission, or prohibition.

Lifetime: a short, medium, or long term application can characterize the duration of a policy.

Trigger mode: the enforcement of a policy can be constantly active, repeated periodically for a specific period time, triggered by asynchronous events or a combination of the last two.

Activity: a policy can monitor or enforce actions on its target objects or react to a new situation that occurs in the system.

Functionality of targets: this class includes policies applicable to resources with common characteristics (e.g. printers, hubs, and routers . . . ).

In Amin Hooda, "Data Management for Supporting Nomadic Users Based on LDAP and Software Agents", Master's Thesis, October, 1998, Department of Computer Engineering, University of Ottawa, Ottawa, Canada, policies are defined as regulations that should facilitate the accountability of proper usage of communication resources, maximize the availability of communication access for users, provide security definitions for accessing a device and its corresponding services, and facilitate the creation of varied secure regions within an organization. The solution set forth in Hooda for including policies in the system is to add certain attributes to the site related data that are stored on an LDAP (Lightweight Directory Access Protocol) directory of each site. These attributes describe the services available in the site and the restricted areas that can only be assigned to privileged users. However, this approach suffers from a number of weaknesses. Firstly, no standard representation of policies is provided. Secondly, the policies are dependent on the system and co-located with the description of the system. Also, the policies are not classified according to the activities they monitor in order to facilitate the enforcement of the policies into the system. Furthermore, no mechanisms are provided to detect and resolve conflicts that are inevitable between enterprises.

SUMMARY OF THE INVENTION

According to the present invention, architecture of multiple agents is provided for setting up and enforcing policies within each site of a virtual network. A policy server represents the global policies of the site and each agent manages its own policies. Policies are dynamically downloaded from the policy server into agents that carry the responsibility to enforce them. Agents propagate their policies to the policy server to detect any conflict that may rise between agents during dynamic mapping and resource reservation. A negotiation mechanism is provided to resolve such conflicts. An authorization-based mechanism is also provided such that agents must request authorization before performing any action, in response to which a ticket is delivered to the requesting agent for accountability and security reasons.

BRIEF DESCRIPTION OF THE DRAWINGS

A detailed description of a preferred embodiment of the present invention is provided herein below with reference to the following drawings, in which:

FIGS. 11A to 11E are graphs illustrating regions of belief of a requestor agent and authorization server, for illustrating the principles of the negotiation model of the present invention.

DETAILED DESCRIPTION OF THE PREFERRED EMBODIMENT

As discussed briefly above, Personal Mobility Management System (PMMS) is an application that manages personal mobility in a virtual network, provides personalized services and provides resource access to its nomadic users over a virtual network. PMMS implements dynamic mapping between a user and the shared devices (or services) available at any location within the network. The dynamic mapping functionality is obtained using the Internet LDAP directory. Another inherent aspect of PMMS is universal messaging for addressing the communication needs of mobile users. Messaging is implemented predominantly by the interaction of autonomous programs (agents), representing users, services, and data resources.

Figure 1:
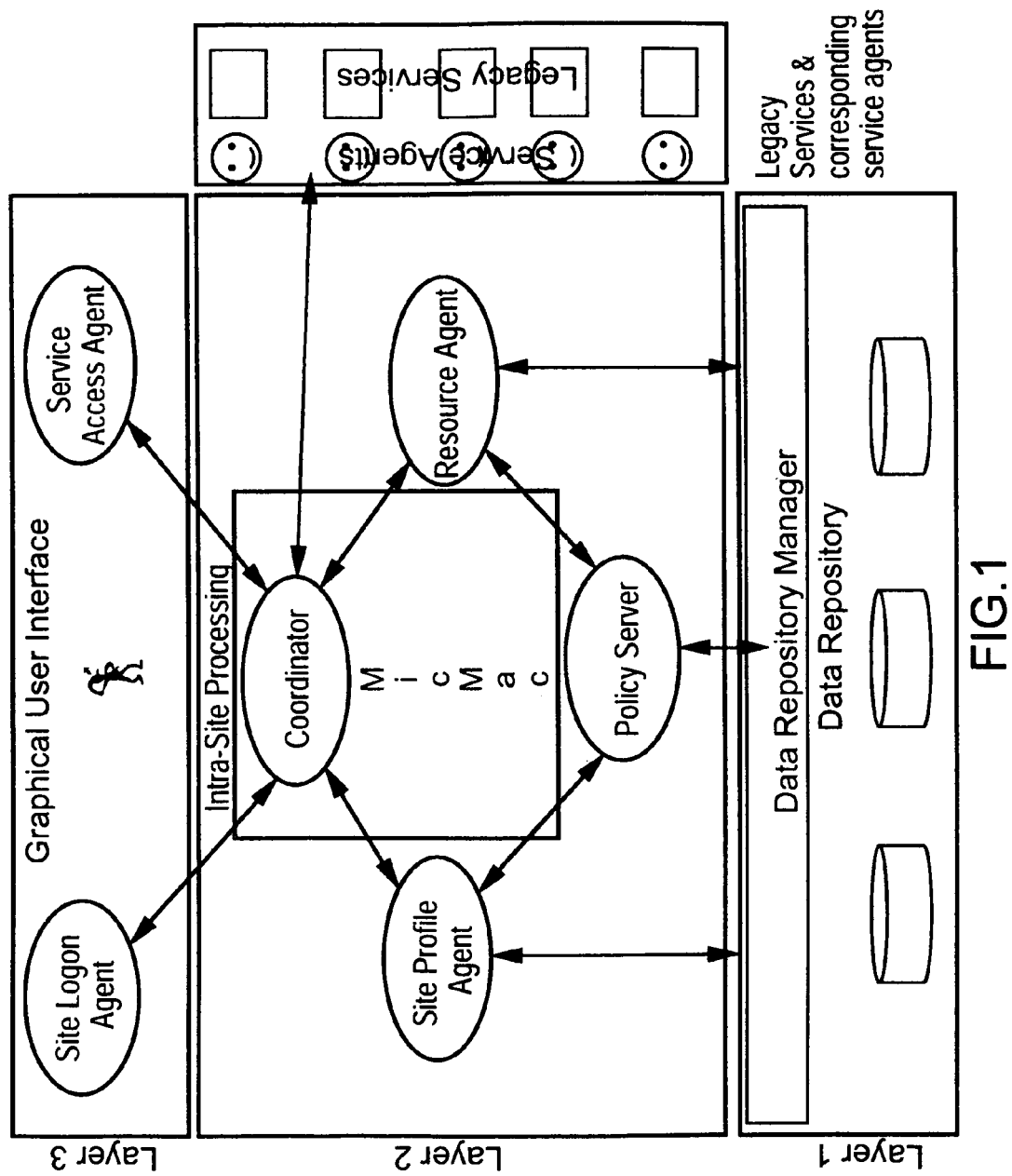
FIG. 1 shows the three-layered architecture of a Personal Mobility Management System (PMMS) forming the preferred environment for implementation of the present invention.

FIG. 1 shows the three-layered architecture of PMMS. Each enabled site within the virtual network maintains this or an analogous structure. Each site also manages a X.500 Directory Information Base (DIB) for its organizational network. This DIB physically resides in the first layer (i.e. Data Repository). The first layer (Layer 1) contains all of the required data information such as user profiles, service profiles and access policies. This layer is only accessible to the middle layer (Layer 2).

Layer 2 deploys intra-site processing agents, as follows:

Site Profile Agent negotiates, with its remote peer (in a user's home site), the user's preferences, and dynamically determines the authorized services for the user, in accordance with the two sets of policies of both concerned sites.

Policy Server maintains the obligations and authorizations allowed or denied to each agent. The server contains the private knowledge base (for each site) regarding authorized services, accessible resources and management rules (cost, delay, privileges, etc.).

Resource Agent negotiates, with its peer, resources for each requested and authorized service. It also creates an environment for this service. Negotiation between two resource agents determines the availability and accessibility of local resources before processing the service.

Coordinator manages the inter-agent communications. Its central role is to establish communication among two or more agents (locally or remotely), to locate agents and to control their activities when exchanging information.

Layer 3 presents a Graphical User Interface (GUI) for the nomadic users. It contains agents and interfaces for user authentication and service access. A mobile user logs onto the system via the User Logon Agent, which functions as the authentication client of the system. After receiving user information as input by the user, the User Logon Agent locates the user in the virtual network and authenticates the user as the one he/she claims to be. A Service Access Agent is responsible for providing dynamically located services to the authenticated user. This interface will not be displayed if the user cannot be identified by his/her home site.

Interactions between agents are established through the exchange of KQML messages over the MicMac blackboard messaging system developed by Mitel Corporation (see R. Buhr, D. Amyot, M. Elammari, D. Quesnel, T. Gray, S. Mankovski, "Feature-Interaction Visualisation and Resolution in an Agent Environment", *Feature Interactions in Telecommunications and Software Systems V.*, K. Kimbler and L. G. Bouma, editors, IOS Press Amsterdam, The Netherlands, 1998, p. 135–149, for a description of MicMac and its operation). MicMac is a set of software tools, which provide an environment to support hands-on experimentation with multi-agent interaction and negotiation protocols. It allows for the creation and the manipulation of one or more Agoras (I.E. tuple space). A tuple space is an open area for exchanging information. A shared Tuple Space is shown in FIG. 2 for effecting inter-site communication according to the present invention.

Figure 2:
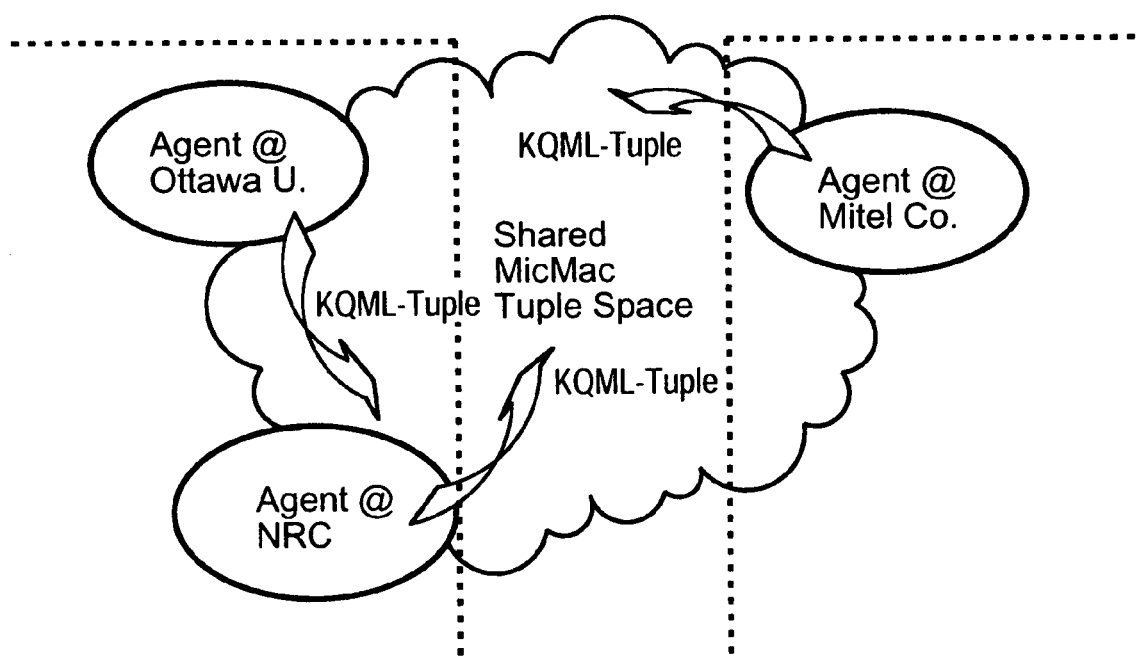
FIG. 2 is a schematic illustration of inter-site communication using a shared Agora for the PMMS system of FIG. 1.
Figure 3:
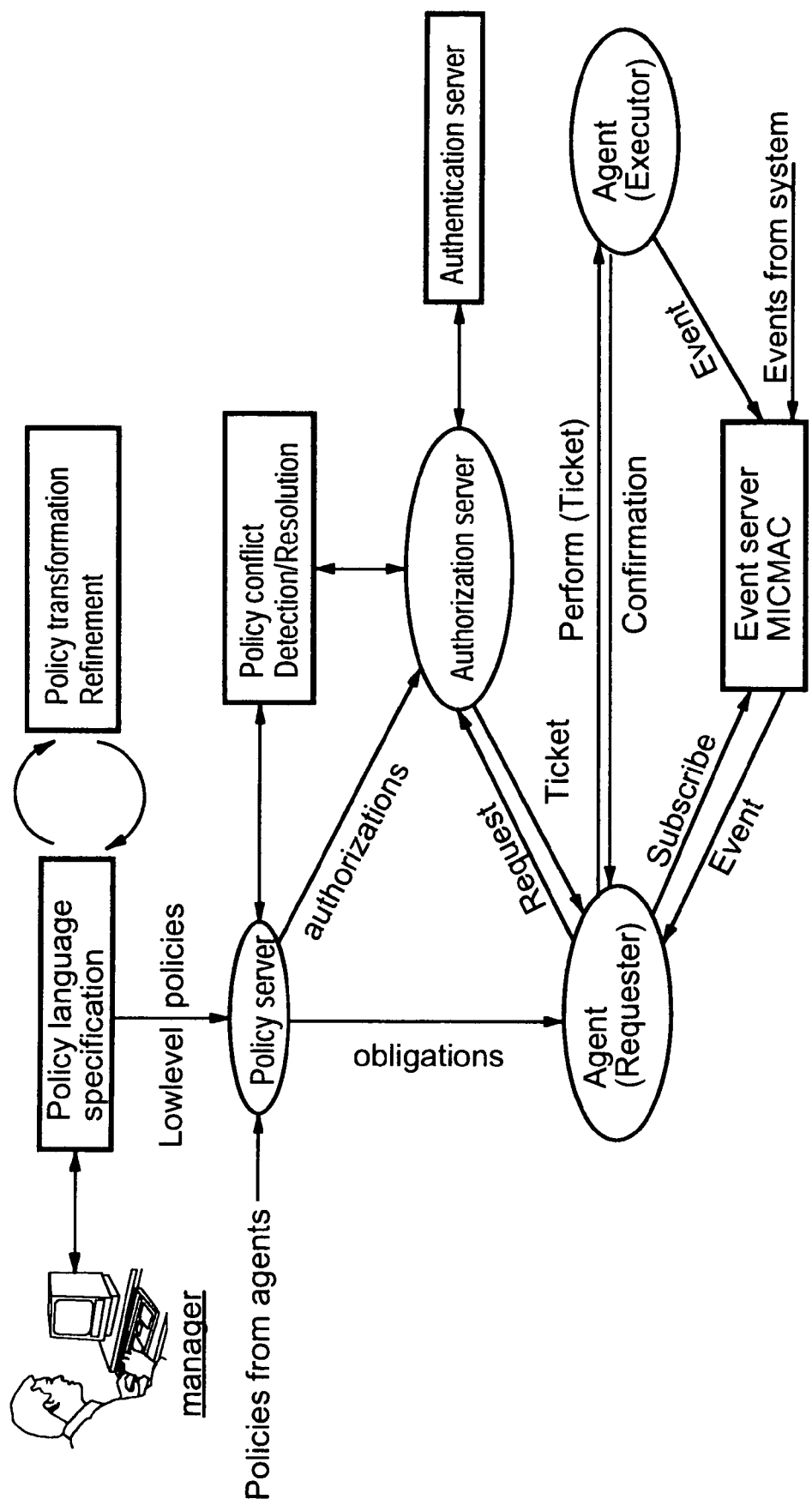
FIG. 3 is a schematic representation of a site policy architecture for implementation within a multi-agent communication system as shown in FIGS. 1 and 2, in accordance with the present invention.

FIG. 3 shows an agent-based site policy architecture according to the present invention for defining and managing policies in a co-operative system such as illustrated in FIG. 2. As discussed above, agents are autonomous entities that behave according to their obligations with respect to the overall policies in the system. Policies are divided into two types: obligations and authorisations. Obligations specify the motivations or tasks an agent is responsible to perform. Authorisations represent the laws of the system and determine whether an agent is allowed to perform a particular action.

According to the present invention, agents can interchangeably play two roles: requester or executor. A requester agent is an agent that needs another agent, i.e. an executor agent, to perform an action in order to fulfil one of its obligations. The executor is an agent that is designed to perform a set of actions as a part of the global role it plays in the system. For example, a printer manager agent is designed to execute printing actions, whereas, a Word application agent requests the printer manager agent to print a document. An agent can also behave both as a requester and as the executor of the same action. Each task is divided into a request action and an execution action in order to ensure that no action will be performed unless it has been authorised by the system policies, as discussed in greater detail below. Policies determine whether or not the executor should perform an action for a requester agent.

Each agent is comprised of two separate modules: a code that represents the actions the agent is designed to execute, and policies that determine the behavior of the agent. The reason for separating the policies from the code of the agent is to permit modification of the policies changing the behavior of the agent without changing the code of the agent. Furthermore, the same agent can be used again in different sites with different policies. Each agent has a set of obligations it is responsible to fulfill and the associated policies determine whether or not the agent can accomplish these obligations.

An obligation is an object with the following attributes:

Trigger: an internal or external event that triggers the obligation.

Subject: specifies the agent responsible for the execution of the obligation when it is initiated.

Action, target, constraints, class, and system mode: These attributes have the same meaning as for the authorization's attributes.

Exception: specifies an action that the subject must perform in the event it fails to accomplish the actions specified by the obligation.

When the conditions of an obligation apply, the agent responsible should perform the set of actions representing the duty of the obligation.

The policy server receives policies from agents or from human managers via interfaces. Obligation policies are downloaded into agents that are responsible to perform them. Authorization policies are distributed to an authorization server, which gives agents necessary authorizations to perform a set of actions. The policy server is responsible for the management of each policy's status. Each policy can, during its life cycle, be enabled, disabled or deleted. Before accepting a policy, the server ensures that the new policy does not conflict with existing policies in the system (referred to herein below as static conflict detection). Run time conflict detection is also used, as described in greater detail below.

The policy server is notified by agents when any change in the system occurs. It reacts to these changes by enabling or disabling policies that already exist in the system, or by distributing new policies. Thus, the system behavior is adapted to meet the requirements of new system states.

The authorization server agent represents the laws of the system. System laws are expressed as authorizations. An authorization is a relationship between the requester agent and an action of the executor agent. Each authorization is an object with the following attributes:

Mode: The mode of an authorization can be either a permission or an interdiction.

Subject: specifies the agent to which the authorization applies. Permission allows the subject to request that the executor agent perform an action. An interdiction prohibits the execution of the action.

Action: specifies a set of operations that the requester agent is authorized to or prohibited from performing, depending on the mode of the authorization.

Target: specifies the agent, also called executor, which executes the action.

Constraint: The applicability of an authorization can be limited using a constraint. The constraint determines the conditions that must be verified in order that the authorization be granted.

Priority: specifies the authority of the policy. A policy with a high authority overrides low priority policies.

Class: classifies policies according to the activity they monitor in the system. Examples of classes are security, accounting, and admission control.

System mode: A system mode represents a specific state of the system. Policies belonging to a system mode are said to define the strategy of the system in this mode.

Creator: specifies the agent or the human manager that adds the policy to the system.

The authorization server is responsible for delivering necessary authorizations to agents requesting the execution of an action. Each agent who requests an authorization is first authenticated. Then, the server checks to see if there are authorizations that apply to the request. The applicable authorizations for the request are processed to give a response to the requester.

A label any can be used instead of a specific requester, action or executor. A default authorization can be set to determine the default behavior of the system. The default authorization can be:

Permission any any any: permits any agent to request any action from any other agent in the absence of a specific interdiction.

Or

Interdiction any any any: Prohibits any agent from requesting any action from any other agent in the absence of a specific permission.

The authorization server confers with a policy conflict detection and resolution agent to detect any conflict that may rise if an action is performed.

The event server (MicMac) collects events from the system and notifies agents that have subscribed to receive these events. For example, an email forwarder agent may be interested in an email-received event. Each time an email is received, the email server notifies the event server. The latter dispatches the event to all agents that are subscribed to it. The email forwarder agent is thus able to accomplish one of its obligations, which consists of forwarding the received email to the actual location of the receiver when he/she is away from the home site. A detailed example of this case scenario is described in greater detail below.

MicMac also provides a low level communication medium to the agents. It provides a blackboard paradigm for the creation of a shared communication space referred to above as an Agora or tuple space. A tuple space is an open area for exchanging information.

According to the present invention, each agent must be authorized before executing any action. To illustrate how this mechanism is effected by agents requesting authorization to execute an action, an example is set forth by which a Word-Agent requests authorization to print a document using a Printer-Manager.

Figure 4:
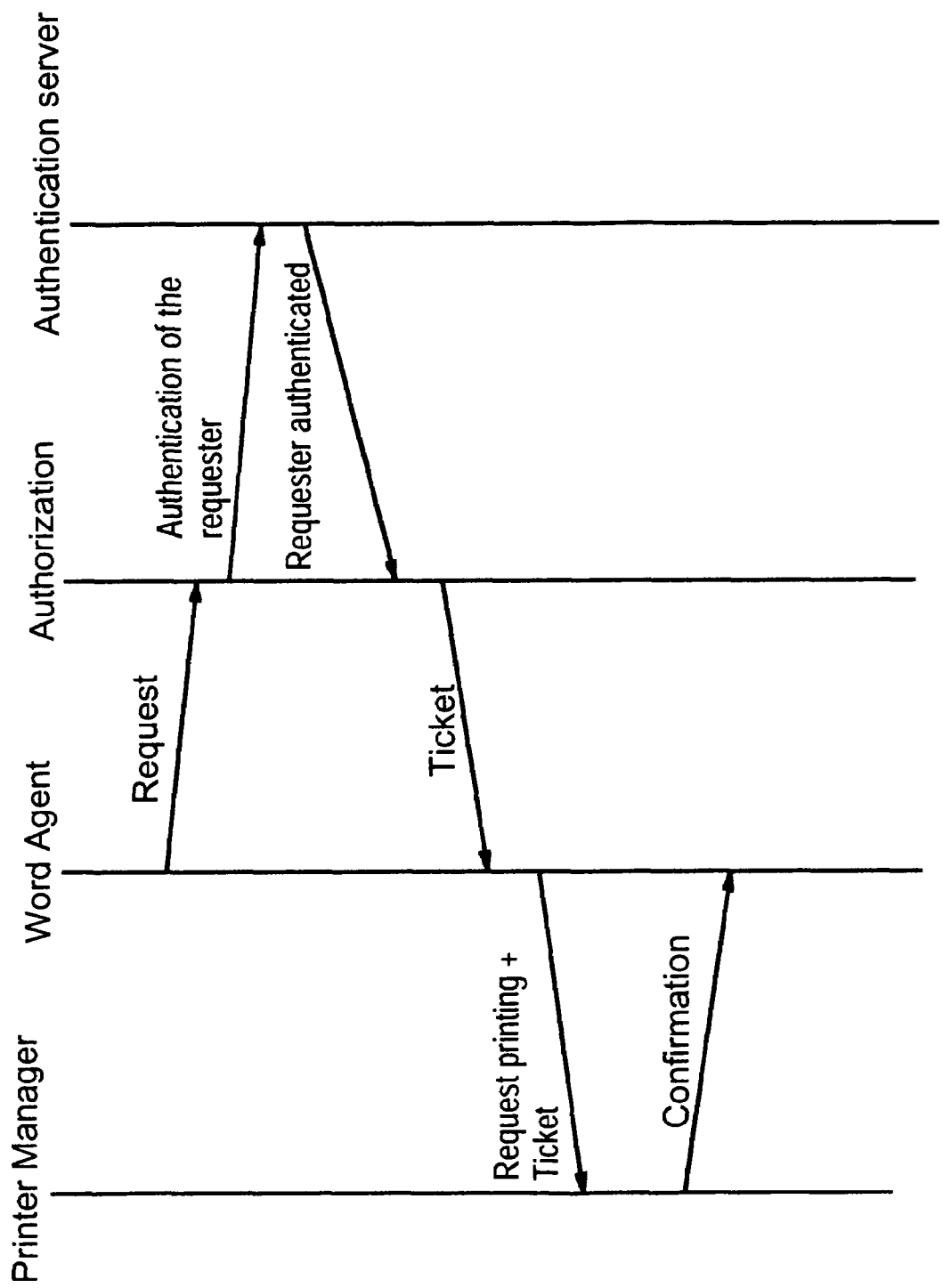
FIG. 4 is a message diagram for illustrating steps by which an agent requests authorization before executing an action, in accordance with the present invention.

FIG. 4 illustrates the steps of requesting an authorization:
1—The agent requester, e.g. Word-agent, sends a request to the authorization server asking for an authorization to execute an action, e.g. print a document. The request message includes the agent identification, the action and its parameters, and the identification of the agent executor of the action.
2—The authorization server authenticates the agent and processes the request. The authorization server will then deliver a ticket that specifies the result of the request. In the case of a negative authorization, the ticket contains the reasons of failure and offers alternative choices to the requester. The requester can then modify the request to fit the conditions required by the policy server.
3—If the request is authorized, the requester sends the ticket to the agent executor of the action, e.g. printer-agent. The executor verifies the authenticity of the ticket and executes the action.
4—A confirmation is sent back to the requester agent to confirm the execution of the action.

The ticket is a token that allows an agent to operate with the rights and privileges of the authorization server that granted the ticket. Naturally, it must be possible to verify that the ticket was granted by the authorization server. The validity of the ticket can be verified by using a public key digital signature. The ticket may include an expiration time. If a non-expiring ticket is desired, the expiration time can be set sufficiently far in the future. Furthermore, the ticket mechanism allows the agents to bill for the services they offer.

As discussed above, policies represent the global strategy of a site. The policies control behavior of the agents belonging to the site and determine how agents should react to any changes in the system. Policies are classified according to the activity they monitor. Four classes of policies are defined for the implementation of this invention: security, admission control, user profile, and resource reservation. These classes of policies are used by the coordinator agent, site logon agent, site profile agent, and resource agent, respectively.

Different system modes are also defined according to the implementation of this invention and the policies are classified according to these modes. Policies belonging to a class mode are enabled when the system mode is enabled. They adapt the behavior of the system to the requirements of a new system state. For example, critical resource mode is enabled when the amount of resources available in the system is under a limit. Thus, policies belonging to this mode are enabled and will define a new resource allocation strategy. Different system modes can be related: when a mode is enabled, other modes are automatically disabled. For example, when critical resource mode is enabled, normal resource mode is automatically disabled.

In order to better understand the concept of policy classification and the effect of system modes, an example of a policy management system is described with reference to a working site according to the present invention, located at the University of Ottawa.

A default policy is defined with a low priority that is applied to all requests. The default policy is used to ensure that at least one policy will apply for a request. The default policy is expressed as follows:

TABLE A

| | | Default Policy | | | | | |
|---|---|---|---|---|---|---|---|
| ID | Mode | Subject | Action | Target | Constraint | Priority | System Mode |
| A000 | Interdiction | Any | Any | Any | | 0 | — |

The default policy is identified as A000, where A denotes that it is an authorisation object. By default, the execution of any action in the system is forbidden. The low priority ensures that this policy will be overridden if at least one other policy applies to the request.

Inter-site communications are encrypted using different encryption algorithms such as DES and RSA. Each encryption algorithm can use a different key length to encrypt data. Encryption policies specify which algorithm should be used for a specific communication between two different sites. Two modes are defined for system security: Normal level and high level. Each mode has a set of policies that define the rules that the system must respect when the mode is enabled. The following policies give an example of some security policies setup by the University of Ottawa to encrypt its communications with the other two sites (FIG. 2).

TABLE B

Security Policies

| ID | Mode | Subject | Action | Target | Constraint | Priority | System Mode |
|---|---|---|---|---|---|---|---|
| A001 | Interdiction | Any | Encrypt | Security | Key_length < 64 | 4 | Normal security level |
| A002 | Permission | Coordinator | Encrypt | Security | Key_length > 64 and site = MITEL Or Key_length > 128 and site = NRC | 3 | Normal security level |
| A003 | Interdiction | Coordinator | Encrypt | Security | Key_length < 196 | 5 | High security level |

The first policy (ID A001) applies to all requesters of an authorization to encrypt a communication. It specifies that it is forbidden for any agent to request a security agent to encrypt data with a key length less than 64 bits. This is a default security policy and sets the minimum degree of security needed for inter-site communications. The second policy (ID A002) is specific to the coordinator agent. It allows this agent to request encryption when it is establishing communication with the MITEL site using an encryption key length greater than 64 bits, or with the NRC site using a key length greater than 128 bits. University of Ottawa assumes that the connection with NRC is not secure enough. Thus, the key length used for encryption should be greater than 128 bits in length to ensure privacy of communication on top of an insecure communication channel. When the system security mode is set to high, the third policy (ID A003) imposes more constraints on the key length.

Admission control policies express rules, which are used to admit a new user into a visited site. They specify eligible users who are provided with access to the site and impose constraints on the login of these authorized users. These policies apply for the site login agent and apply each time a new user wishes to log onto a visited site. Some examples of admission control policies used by the University of Ottawa site are set forth in Table C, from which it will be noted that the subject and the target are the same agent.

TABLE C

Admission control policies

| ID | Mode | Subject | Action | Target | Constraint | Priority | System Mode |
|---|---|---|---|---|---|---|---|
| A004 | Interdiction | Site logon | login | Site logon | {S} day = Sunday | 4 | Normal load |
| A005 | Permission | Site logon | login | Site logon | User.Site = NRC Or (User.Site = MITEL and User.Category = Manager) | 2 | Normal load |
| A006 | Interdiction | Site logon | login | Site logon |  | 3 | Heavy load |

The first policy (ID A004) prohibits access to any user on Sundays. The second policy (ID A005) permits access to all NRC users but restricts access of MITEL users to MITEL managers. When the system switches to heavy load mode, the third policy (ID A006) is enabled, thereby prohibiting access to the site.

Examples of a second type of policy are shown in Table D, where the ID is prefaced with an "O", which indicates an "obligation" object. The site logon agent is obliged to notify the event server (MicMac) when the number of users in the system reaches a predetermined limit. The related obligations are expressed as follow:

TABLE D

Site logon obligations

| ID | Trigger | Mode | Subject | Action | Target | Constraint | System Mode |
|---|---|---|---|---|---|---|---|
| O001 | On login | Obligation | Site logon | Notify("Heavy load") | Event server | {S} users = 7 | Normal load |
| O002 | On logout | Obligation | Site logon | Notify("Normal load") | Event server | {S} users = 4 | Heavy load |

The notification of the first obligation (ID O001) is used by the policy server to switch the system mode to heavy load mode, whereas the notification of the second obligation (ID O002) is used to switch the system mode back to normal load.

The successful prototype of the invention presently in operation at the University of Ottawa is capable of offering three services: printing, email forwarding, and video mail service. A different quality of service (QoS) is used for each delivered service. For example, video service has three qualities of service. A high quality of service plays back an entire video for a user. Medium quality extracts video frames using a key framing application, see Ahmed M. and Karmouch A. "Improving Video Processing Performance using Temporal Reasoning", SPIE-Applications of Digital Image Processing XXII, Denver Co USA, Jul. 20–23 1999. and displays the resulting frames to the user. Low quality of service displays the resulting frames in black and white.

As discussed briefly above, the site profile agent maps the user's profile onto the local policies of a site. The following example defines some policies used by the University of Ottawa site to offer services to visiting users from MITEL and NRC sites. The example is limited to video service.

TABLE E

Policies for user profile mapping

| ID | Mode | Subject | Action | Target | Constraint | Priority | System Mode |
|---|---|---|---|---|---|---|---|
| A007 | Permission | Site profile | Use_Video | Site Profile | QoS = 1 and Cost > 15 Or QoS = 2 and Cost > 25 Or QoS = 3 and Cost > 40 | 3 | Normal resource mode |
| A008 | Interdiction | Site profile | Use_Video | Site Profile | QoS = 3 AND User.Category <> Manager | 3 | Normal resource mode |
| A009 | Permission | Site profile | Use_Video | Site Profile | QoS = 1 and Cost > 40 Or QoS = 2 and Cost > 70 | 4 | Critical resource mode |

The first policy (ID A007) sets a minimum cost required to use the video service. The cost depends on the quality of service to be used. For example, a high quality video service can not be used unless the user pays at least 45 units.

The second policy (ID A008) limits the use of the high quality of video service to managers from both sites.

The third policy (ID A009) is invoked during system critical resource mode. It raises the cost for using the low and medium quality of service and prohibits the use of the high quality of service.

Other policies are used to set more constraints with the use of video service, but are not set forth herein for the sake of simplicity.

Each site offers its visitors a set of services resulting from the dynamic mapping of the user's profile and the local policies of the site. When the visitor starts a service, the agent representing the service reserves a predetermined amount of resources, CPU and Bandwidth, required for the execution of the service with a specific quality, as set forth in Table F:

TABLE F

Video agent obligations

| ID | Trigger | Mode | Subject | Action | Target | Constraint | System Mode |
|---|---|---|---|---|---|---|---|
| O003 | On startup | Obligation | Video agent | Reserve(CPU = 20, Band = 5) | Resource agent | QOS = 1 | Normal resource mode |
| O004 | On startup | Obligation | Video agent | Reserve(CPU = 35, Band = 10) | Resource agent | QOS = 2 | Normal resource mode |
| O005 | On startup | Obligation | Video agent | Reserve(CPU = 75, Band = 20) | Resource agent | QOS = 3 | Normal resource mode |
| O006 | On startup | Obligation | Video agent | Reserve(CPU = 15, Band = 3) | Resource agent | QOS = 1 | Critical resource mode |
| O007 | On startup | Obligation | Video agent | Reserve(CPU = 25, Band = 7) | Resource agent | QOS = 2 | Critical resource mode |
| O008 | On startup | Obligation | Video agent | Reserve(CPU = 45, Band = 12) | Resource agent | QOS = 3 | Critical resource mode |

These obligations define the amount of resources to be reserved for each quality of service in each mode. The video agent automatically adapts the requirements of the video application to the actual state of the system.

A resource reservation strategy is defined by policies that apply to controlling the reservation of resources via the resource agent, as set forth below in Figure G. Again, this example is limited to video service. In Table G, and subsequently in this disclosure, it should be noted that {S} stands for a system parameter (e.g. {S} Bandwidth is the available bandwidth in the system whereas Bandwidth is the required bandwidth to be reserved by a resource agent).

TABLE G

Resource reservation policies

| ID | Mode | Subject | Action | Target | Constraint | Priority | System Mode |
|---|---|---|---|---|---|---|---|
| A010 | Permission | Video Agent | Reserve | Resource Agent | {S} CPU > 200 and CPU < 30 Or {S} CPU > 300 and CPU < 50 | 5 | Normal resource mode |
| A011 | Permission | Video Agent | Reserve | Resource Agent | {S} Bandwidth > 40 and Bandwidth < 5 Or {S} Bandwidth > 70 and Bandwidth < 10 | 5 | Normal resource mode |
| A012 | Interdiction | Video Agent | Reserve | Resource Agent | CPU > 20 OR Bandwidth > 4 | 7 | Critical resource mode |

Policies that belong to normal resource mode are used to monitor the resource reservation strategy for this particular resource mode. The first and the second policies (ID A010 and ID A011) specify the maximum amount of CPU and bandwidth that the video agent can reserve depending on the available amount of CPU and Bandwidth on the site.

The third policy (ID A012) prohibits an excessive reservation of resources when the resource status is critical (the resource status can switch between two values: normal and critical). Critical status means that the available resources in the system are below a critical value. After each reservation, the resource agent notifies the system if there has been any change in the resource status. This obligation is expressed as follows:

TABLE H

Resource agent obligations

| ID | Trigger | Mode | Subject | Action | Target | Constraint | System Mode |
|---|---|---|---|---|---|---|---|
| O03 | On reservation done | Obligation | Resource agent | Notify("critical resource mode") | Event server | {S} CPU < 100 OR {S} Bandwidth < 40 | Normal resource mode |
| O04 | On resources released | Obligation | Resource agent | Notify("normal resource mode") | Event server | {S} CPU > 200 And {S} Bandwidth > 70 | Critical resource mode |

According to the invention, agents are designed to notify the policy server when a change in the system mode occurs. The policy server reacts to these changes by enabling and/or disabling certain policies in order to adjust the system behavior to the requirements resulting from the new state. These reactions are expressed as obligations:

The enabled policies guarantee that the system will behave to fit the requirements of the new system state. For example, the heavy load mode enables Interdiction A006, which prohibits any user from logging into the system.

TABLE I

Policy server obligations

| ID | Trigger | Mode | Subject | Action | Target | Constraint | System Mode |
|---|---|---|---|---|---|---|---|
| O05 | On heavy load mode | Obligation | Policy server | Enable("heavy load mode") Disable("normal load mode") | Policy server | — | — |
| O06 | On critical resource mode | Obligation | Policy server | Enable("critical resource mode") Disable("normal resource mode") | Policy server | — | — |

In accordance with the principles of a publish-subscribe mechanism such as MicMac, many policies may apply for the same request. The authorization server processes all of these policies in order to make a final decision as to which policy will prevail. First, the authorization server loads all enabled policies that apply for the request, and then it evaluates each policy to determine if the conditions specified by the policy constraint apply. The evaluation of a policy constraint involves three steps: constructing a decision tree, decorating the tree and extracting the decision related to the policy. The actual mode is then added to the attributes of the policy. The authorization server selects the applicable policies with highest priority in order to make the final decision concerning a request.

An example is provided below to illustrate the steps used in processing a request. The example relates to the reservation of system resources by a video agent, which executes a video service with a specific quality of service. The exemplary request is expressed as follow: Video agent asks authorization to reserve (CPU=25, Bandwidth=15) by resource agent. The following tables summarize the state of the system and the amount of resources available in the system at the time of the request is made.

TABLE J

Available resources

| Resource | Value |
|---|---|
| CPU | 250 |
| Bandwidth | 100 |
| Disc | 60 |

TABLE K

System modes

| System Mode | Status |
|---|---|
| Normal resource mode policies | Enabled |
| Critical resource mode policies | Disabled |
| Heavy load policies | Disabled |
| Normal load policies | Enabled |
| High level security policies | Disabled |
| Low level security | Enabled |

The authorization server first loads all enable policies that apply to this request. The following table gives the policies that apply for video agent requests.

TABLE L

Policies that apply for the video agent request

| ID | Mode | Subject | Action | Target | Constraint | Priority | Class |
|---|---|---|---|---|---|---|---|
| A000 | Interdiction | Any | Any | Any | | 0 | — |
| A010 | Permission | Video Agent | Reserve | Resource Agent | {S} CPU > 200 and CPU < 30 Or {S} CPU > 300 and CPU < 50 | 5 | Normal resource mode |
| A011 | Permission | Video Agent | Reserve | Resource Agent | {S} Bandwidth > 40 and Bandwidth < 5 Or {S} Bandwidth > 70 and Bandwidth < 10 | 5 | Normal resource mode |
| A021 | Interdiction | Video Agent | Reserve | Resource Agent | Bandwidth > 12 OR CPU > 70 | 5 | Normal resource mode |

The evaluation of a policy involves an evaluation of the conditions representing the constraints of the policy. The policy A000 has no constraint, therefore, the actual mode of the policy is Interdiction. The policy A010 has a constraint to be applicable. The evaluation of the constraint determines if the policy applies (or not) to the request.

Figure 5A:
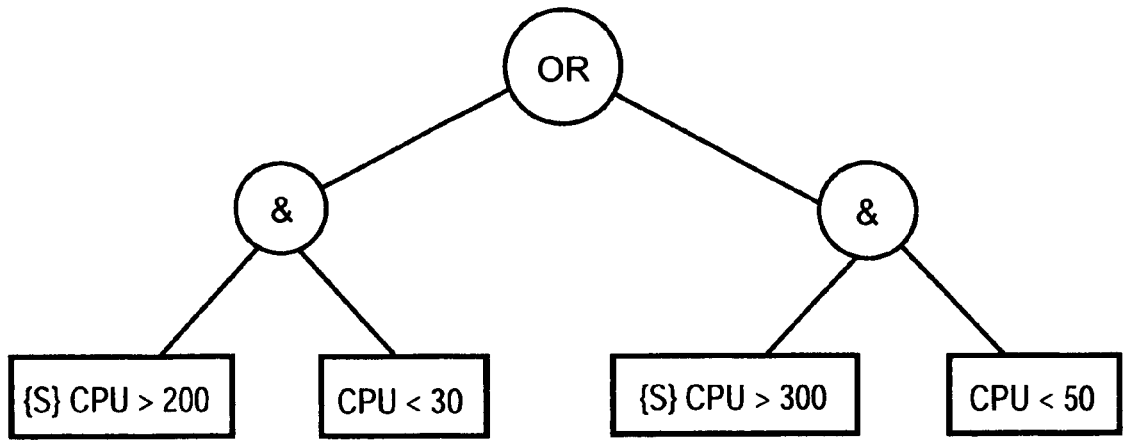
FIG. 5A shows a first exemplary constraint tree structure for use in evaluating policies according to the present invention.
Figure 5B:
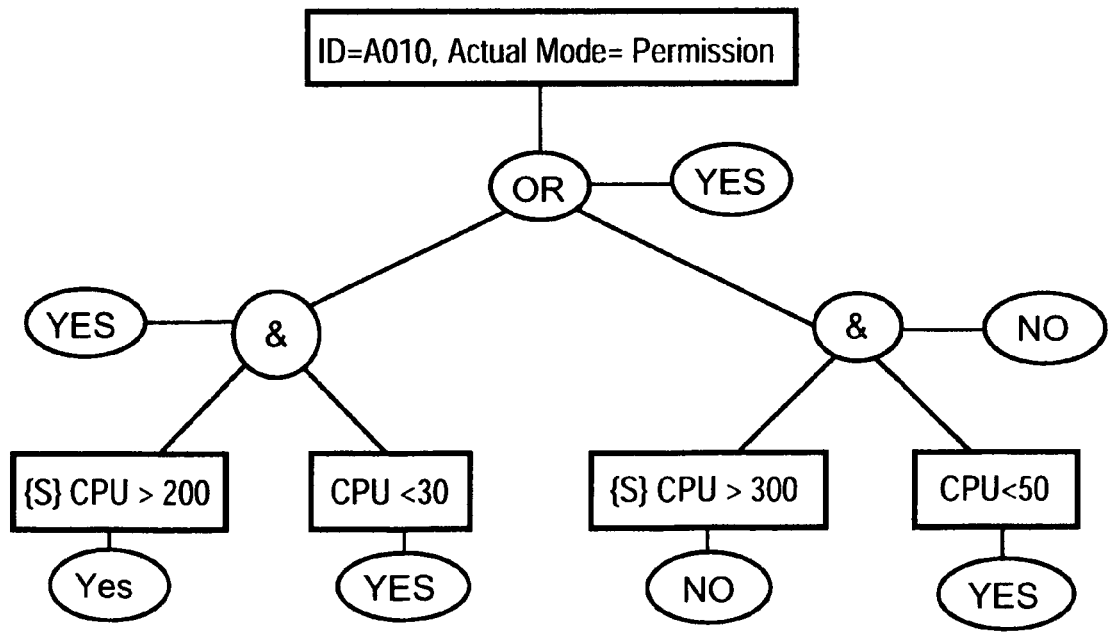
FIG. 5B shows the constraint tree structure of FIG. 3A decorated according to the values of parameters in the request and in the system.

The tree diagram of FIG. 5A represents the constraint of the A010 policy. Each leaf of the tree represents a condition of the global constraints. Although the example set forth herein is characterized by a simple representation of conditions, it will be understood that more complex representations are possible. Conditions that are preceded by {S} stands for a condition that depends on the system, otherwise, the condition depends on the parameters specified by the request. The tree is decorated according to the values of parameters in the request and the actual values of system parameters (e.g. the available CPU in the system). FIG. 5B shows the decorated tree representing the policy A010. The result of the evaluation of this policy is permission.

Figure 6:
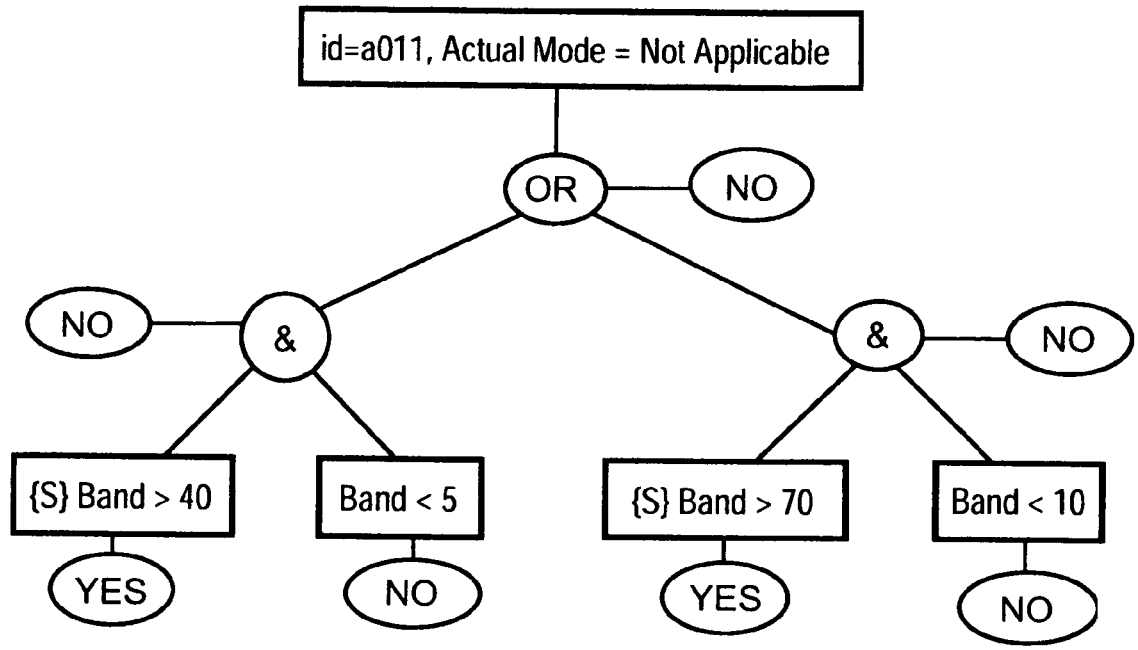
FIGS. 6 and 7 show second and third exemplary decorated constraint tree structures in accordance with the present invention.

The policy A011 is evaluated using the same technique. The decorated tree of this policy is illustrated by FIG. 6. This policy neither permits nor prohibits the request. Therefore, the actual mode of the policy is set to "not applicable".

Figure 7:
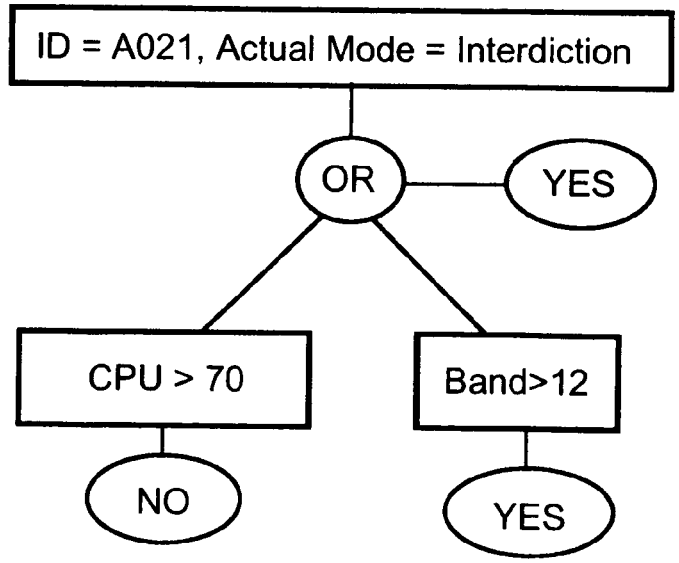

The decorated tree of the policy A021 is illustrated by the tree diagram of FIG. 7. The evaluation of this policy is interdiction. Table M summarizes the results of the evaluation of policies:

TABLE M

Summary of evaluation

| ID | Mode after evaluation | Priority |
|---|---|---|
| A000 | Interdiction | 0 |
| A010 | Permission | 5 |
| A011 | Not applicable | 5 |
| A021 | Interdiction | 5 |

The authorization server uses the highest applicable policies to make a decision. In this example, it uses policies A010 and A021. By default, Interdiction overrides permissions. Thus, the request is rejected.

The above example shows three different modes that result from the evaluation of policies. Another mode, conditional, is applicable if some parameters of the request are modified. This type of result is used for negotiation between agents.

Described thus far, is a framework of agents that behave to fulfill their obligations in respect of the overall policies of the system. Policies are setup by human managers or by the agents themselves. Each agent propagates a set of policies to make other agents know and respect its obligations. Agents can have different goals and obligations, which can result in conflicting policies being set up in the system. To illustrate these conflicting policies, consider the email-forwarding scenario:

Among the services offered by the University of Ottawa, is an email forwarding service. An email forwarder agent has an obligation to forward each received email to the visiting site where the receiver is currently connected. This obligation is expressed as follows:

O025 On email_received EForwarder forward (Transfer-Mode=Urgent, Site=current-location) when (receiver.location<> home)

A second agent, email screener, has an obligation to set certain restrictions on the forwarding of received emails. The email screener propagates an interdiction policy to constrain the actions of any agent in the system, as follows:

A032 Interdiction any forward Mail-Server Creator mail screener

Figure 8:
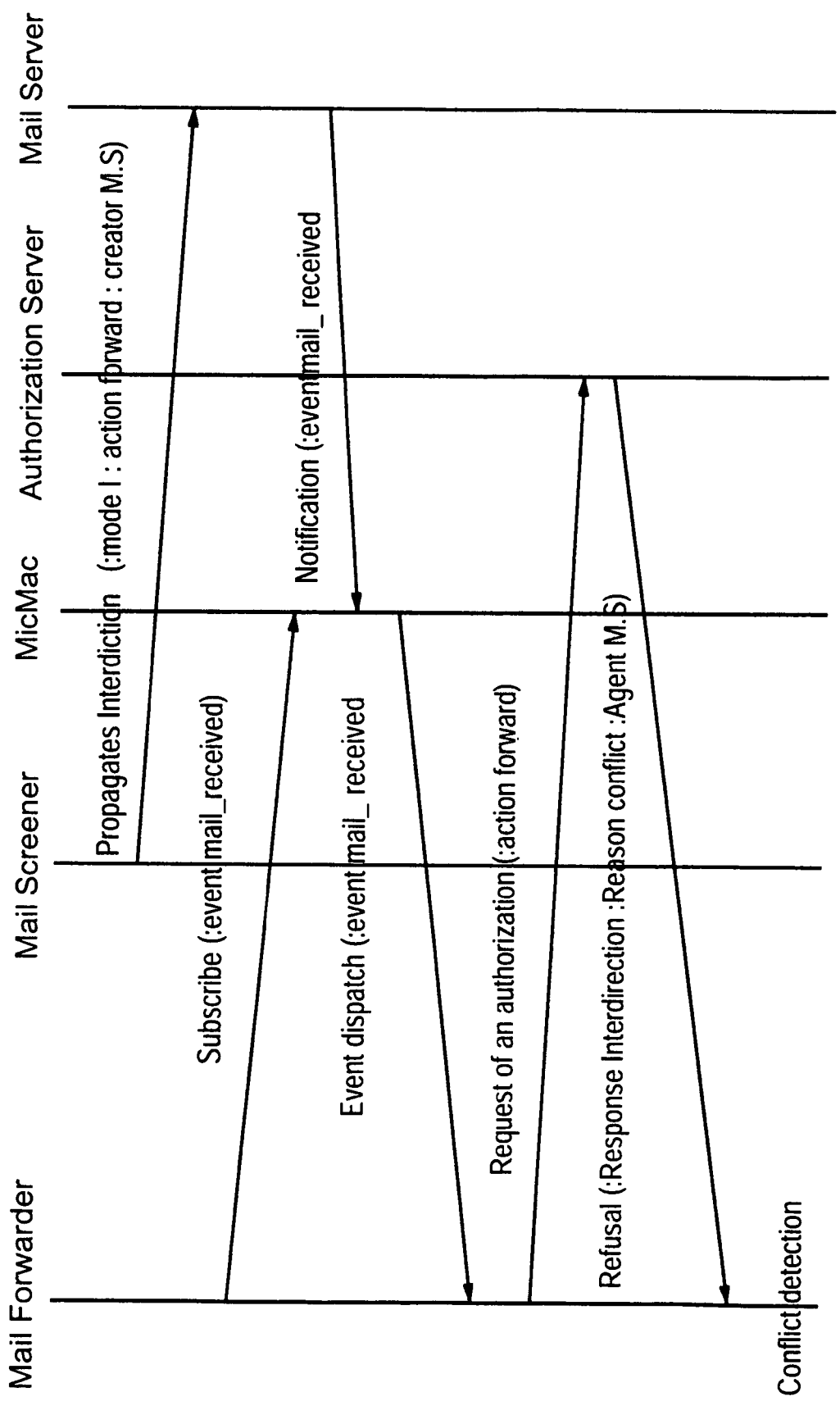
FIG. 8 is a message diagram showing interaction between agents in a conflict detection example according to the present invention.

The scenario of this example is shown in FIG. 8. When a new email is received, the mail server notifies the event server (i.e. MicMac). The latter dispatches the event to all agents that are subscribed to this event. Among these subscribers, the email forwarder agent has an obligation to forward the received email. It requests an authorization for this forwarding action. However, the request is rejected because of the interdiction that has been setup by the email screening agent. Thus, the email forwarding and screening agents are seen to be in conflict as a result of two conflicting policies. Therefore, in accordance with the present invention, the two agents enter a negotiation session for the resolution of this conflict.

An example of the negotiation model of conflict resolution according to the present invention is set forth below with reference to FIGS. 9 and 10, which return to the video agent scenario discussed above.

Figure 9:
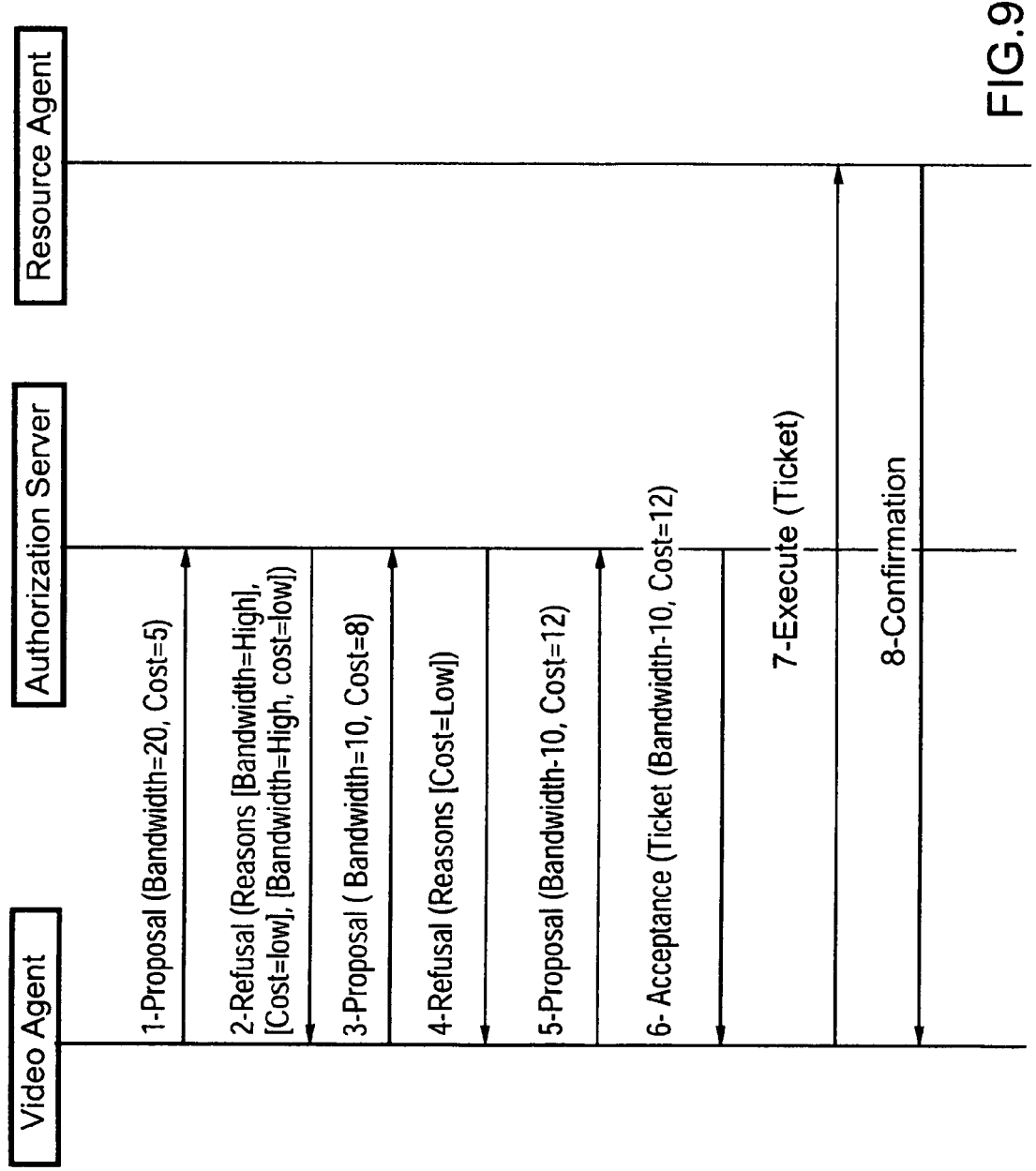
FIG. 9 is a message diagram showing a negotiation scenario between the authorization server and a video mail agent to agree on reservation parameters.

FIG. 9 illustrates a negotiation scenario between the authorization server and the video agent:

1—The agent requester, e.g. Video agent, sends a request to the authorization server asking for an authorization to execute an action, e.g. reserve bandwidth. The request message includes the agent identification, the action and its parameters, e.g. Bandwidth and Cost, and the identification of the agent executor of the action. In this example, the video agent starts by requesting an amount of bandwidth and proposes to pay a cost for the reservation.

2—The authorization server authenticates the agent and processes the request according to the policies stored in the system, and thereafter delivers a response to the video agent. In case of a negative authorization, the response contains the reasons of failure and offers alternative choices to the requester. The requester can then modify the request to fit the conditions required by the authorization server. In this example, the first proposal of the video agent has been refused and the authorization server offers it three choices: 1. Decrease the amount of bandwidth. 2. Increase the cost. 3. Increase the cost and decrease the amount of bandwidth.

3—The video agent chooses, according to its local policies, to reduce the bandwidth and to increase the cost. It sends the second proposal to the authorization server.

4—The second proposal is processed by the authorization server which then delivers a response to the video agent: Cost is insufficient to reserve the requested amount of bandwidth.

5—The video agent verifies if an increase of the cost will not violate any of its policies and then sends a third proposal to the authorization server.

6—The authorization server accepts the proposal. The acceptance is sent as a ticket, which gives the video agent the right to request an executor, e.g. Resource Agent, to reserve the bandwidth for transferring video mail.

7—The executor verifies the authenticity of the ticket and executes the action.

8—A confirmation is sent back to the requester agent to confirm the execution of the action.

At step 6, above, the agent should look for an agent who is capable of executing the requested action. According to another aspect of the present invention, a facilitator agent is provided which can facilitate the search of video mail. The Micmac server is capable of fulfilling this function. As shown in FIG. 10, the video agent sends the ticket to the facilitator agent, which forwards it to all potential agents. In the present example, it is assumed that the facilitator has knowledge of three resource agents who might be interested in executing the action.

The agents interested in this offer can then reply to the requester agent proposing to execute the action, and may specify additional constraints to execution of the action (e.g. more cost), or provide some additional information about the execution (e.g. guaranteeing the reservation). The requester chooses the best offer, or negotiates, according to the model described above, with agents that are providing the best offer. In this example, the video mail agent receives two offers from three different resource agents. Each one proposes to execute the action but with different conditions.

Figure 10:
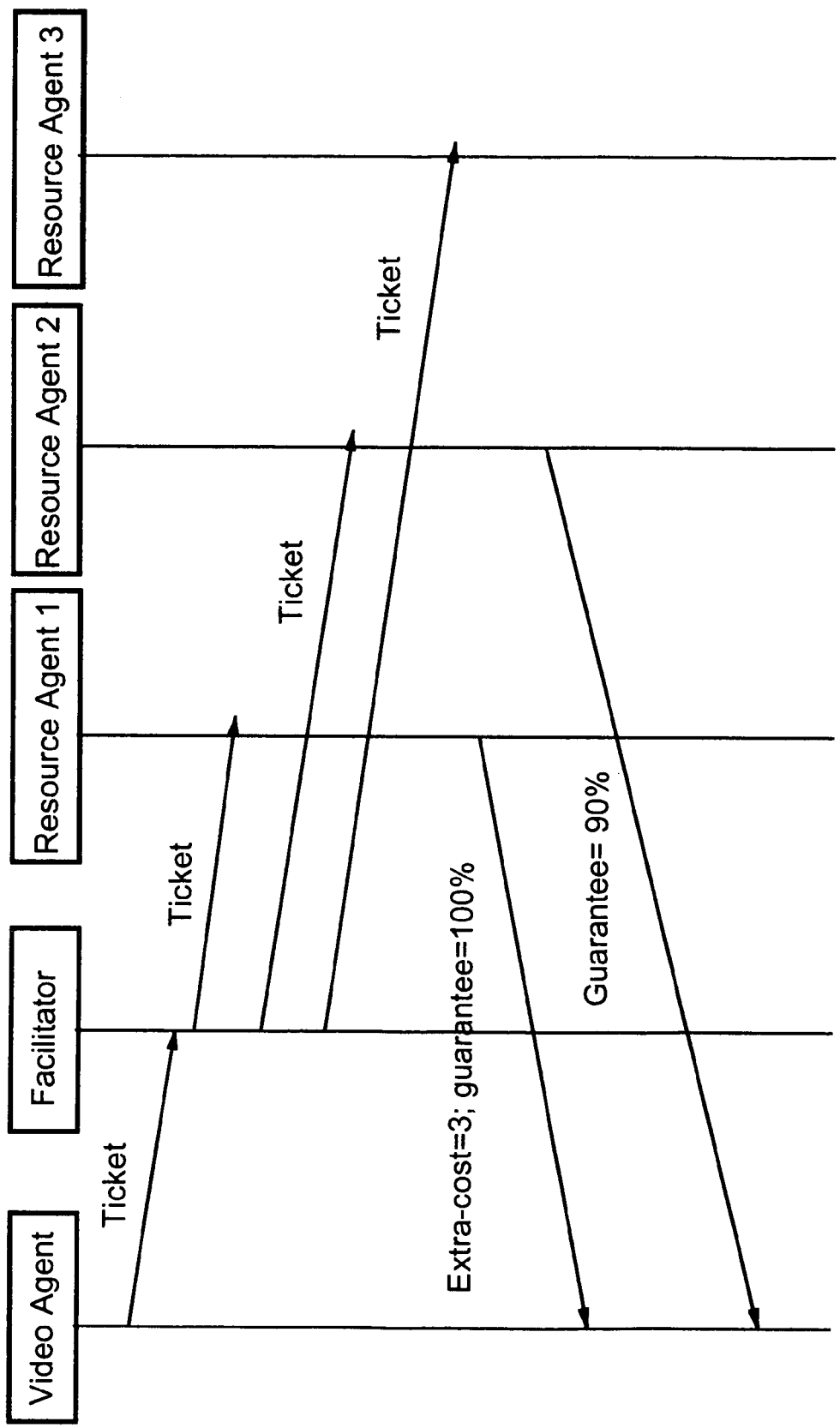
FIG. 10 is a message diagram showing the interaction of the video agent with the facilitator to find executors of the agreed action, and responses of the potential executors of the action.

As illustrated in FIG. 10, the first resource agent proposes to reserve the requested bandwidth with a guarantee of 100% but with a cost of 15 (an extra cost for the guarantee). The second resource agent agrees to reserve the bandwidth but with a guarantee of 90%. The third refuses to execute the action and thus does not send any offer to the requesting agent. Depending on its policies, the video agent chooses an offer.

The negotiation model used in the present invention has, for its purpose, to reach an agreement between two or more agents having different beliefs. Agreement is reached when the proposal does not violate any policy of the negotiating agents. As shown in FIG. 11, a belief, in general, can be represented as a function: $Kn=\Sigma f_p(cost, bandwidth)$, wherein each region of the graph has a priority p to express the degree of belief of the agent. The priority, p, expresses the strategy of an agent. Thus, in FIG. 11A the video agent strongly believes that it must reserve a certain amount of bandwidth at a small cost. On the other hand, it weakly believes (i.e. does not prefer), to reserve this same amount of bandwidth at a high cost. A proposal, P, is represented by a point on the graphs.

A measure between a point P, i.e. a proposal, and a region of belief $R_b$ may be defined as:

$$M(P, R_b) = \min\left(d(P, X) + \frac{\alpha}{p^\beta}\right);$$

$\forall \chi \in R_b$; where d is the distance between two points (i.e. the Cartesian distance: $\sqrt{X^2+Y^2}$), and p denotes the priority of the region.

In the above formula, the 1/p term expresses the tendency of an agent to prefer its strong beliefs over weaker ones. The weights, $\alpha, \beta$, control the impact of the priority in making a decision, and to make the priority of the regions dynamic.

Figure 11A:
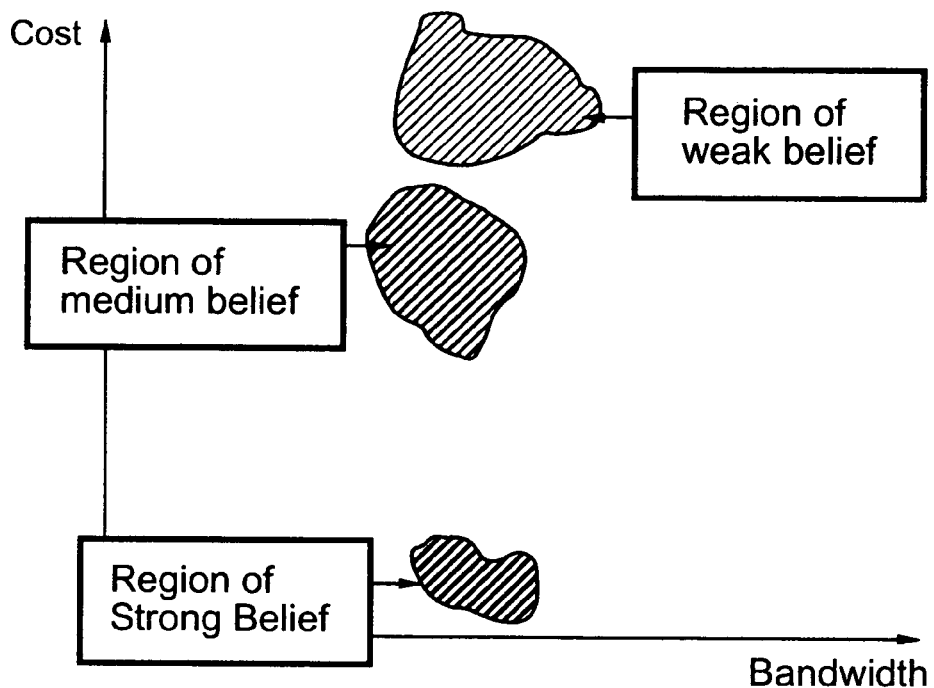
Figure 11B:
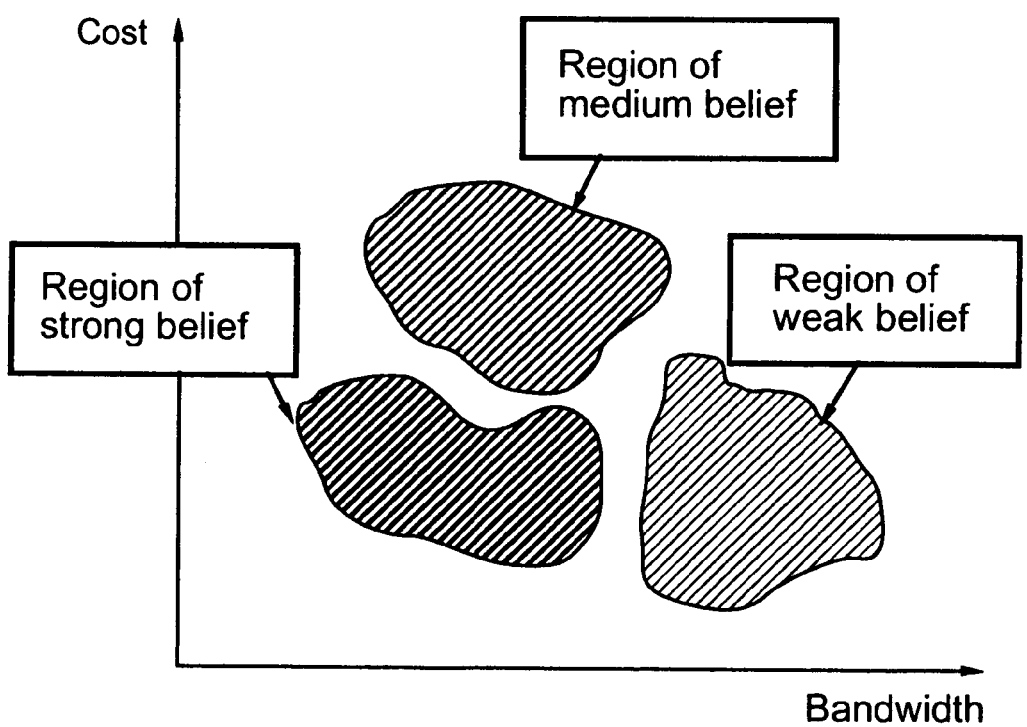
Figure 11D:
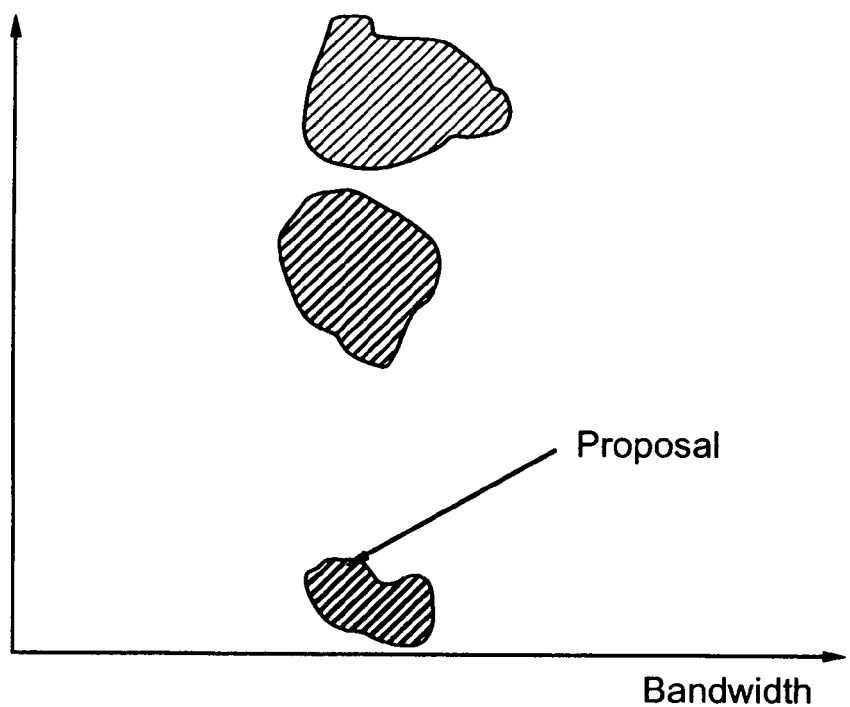
Figure 11E:
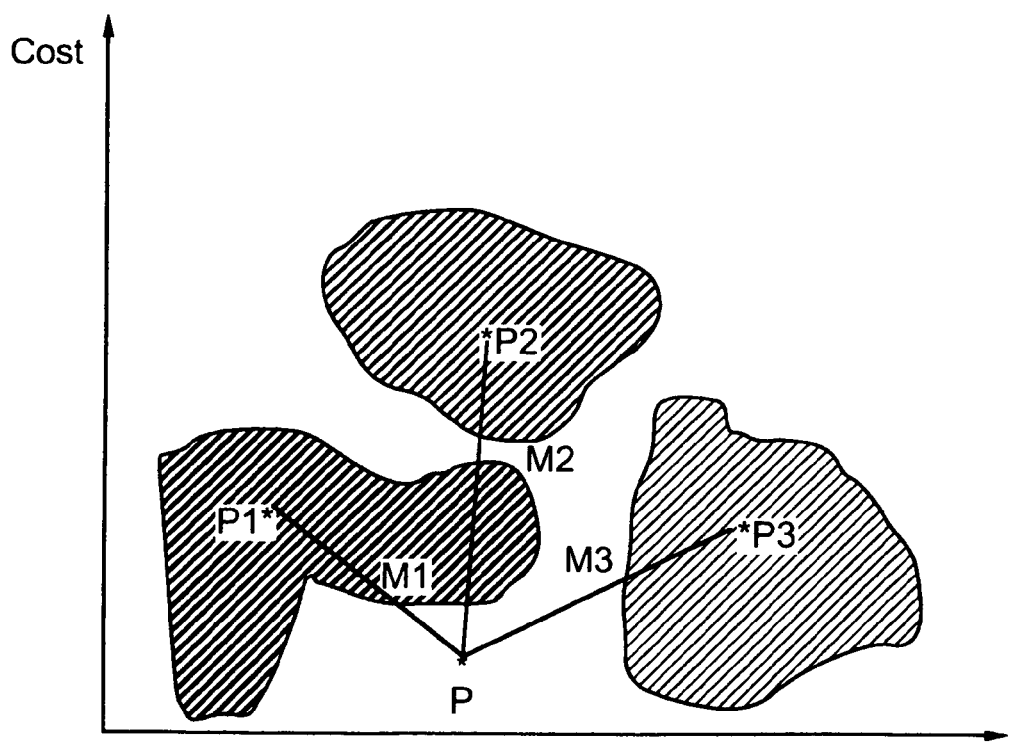

Thus, when an agent wants to propose, or receives a proposal, it uses the formula above to make the decision. Returning to the example above, the video agent chooses a point from its strong belief region, i.e. the region with the highest priority, and sends the proposal to the authorization server as shown in FIGS. 11D and 11E.

Using the above formula, the authorization server looks for the nearest region to the proposal. Specifically, it measures the distances M1, M2, M3 between the point P and the regions R1,R2 and R3 respectively. Since M1 is the smallest distance, i.e. R1 is the nearest region, the authorization server, chooses to guide the video agent to the first region of belief R1.

Figure 12A:
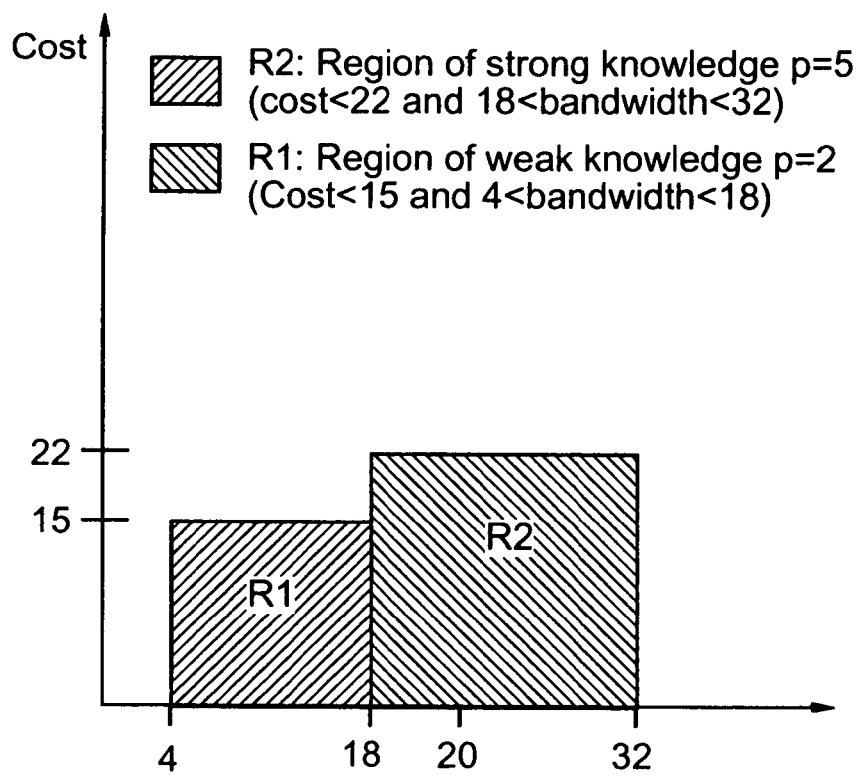
FIGS. 12A to 12E are graphs similar to those of FIG. 11, for the example of a video mail agent-requesting bandwidth for transmission of a video mail message as set forth in FIGS. 9 and 10.
Figure 12B:
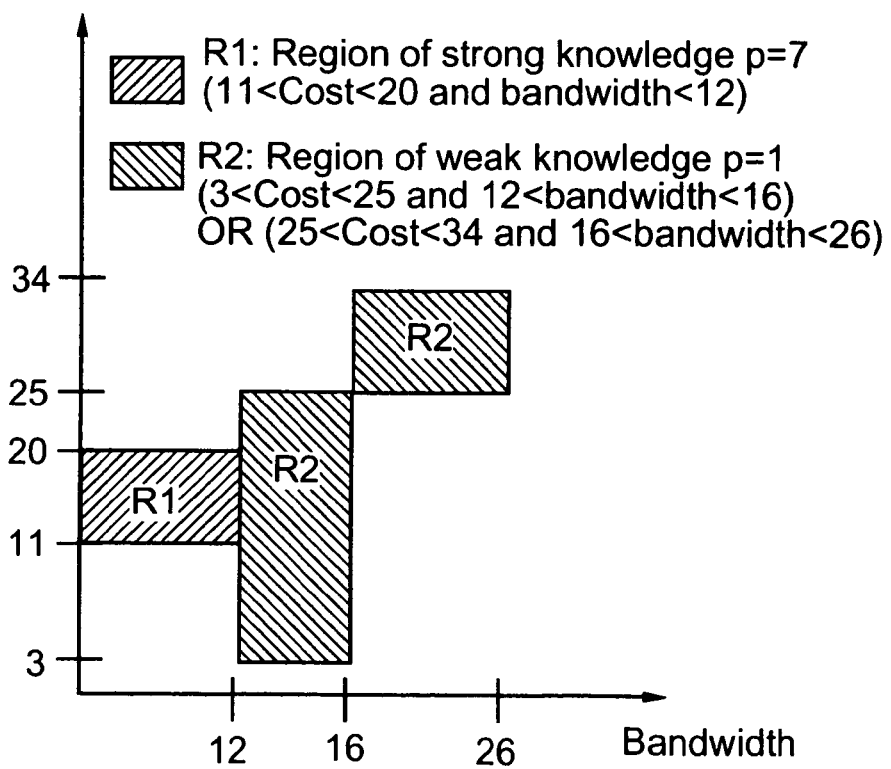

Returning to the video agent example, the functions that represent the knowledge of the agents are linear, such that knowledge can be represented by the constraints of the policies, for example, (cost<22 and 18<bandwidth<32 with priority p=5) OR (Cost<15 and 4<bandwidth<18 with priority p=2) as knowledge of the video agent, and ((11<Cost<20 and bandwidth<12 with priority p=7) OR ((3<Cost<25 and 12<bandwidth<16) OR (25<Cost<34 and 16<bandwidth<26) with priority=1)) as knowledge of the authorization server, as shown in FIGS. 12A and 12B.

The knowledge, represented above, is used by the two agents to propose or to evaluate a proposal. The following specific formula is used when an agent has to evaluate a proposal and deliver a counter proposal.

$$M(P, R) = \min\left(\sqrt{(x_p - x)^2 + (y_p - y)^2} + \frac{2}{p^3}\right);$$

$\forall X(x,y) \in R$

Figure 12C:
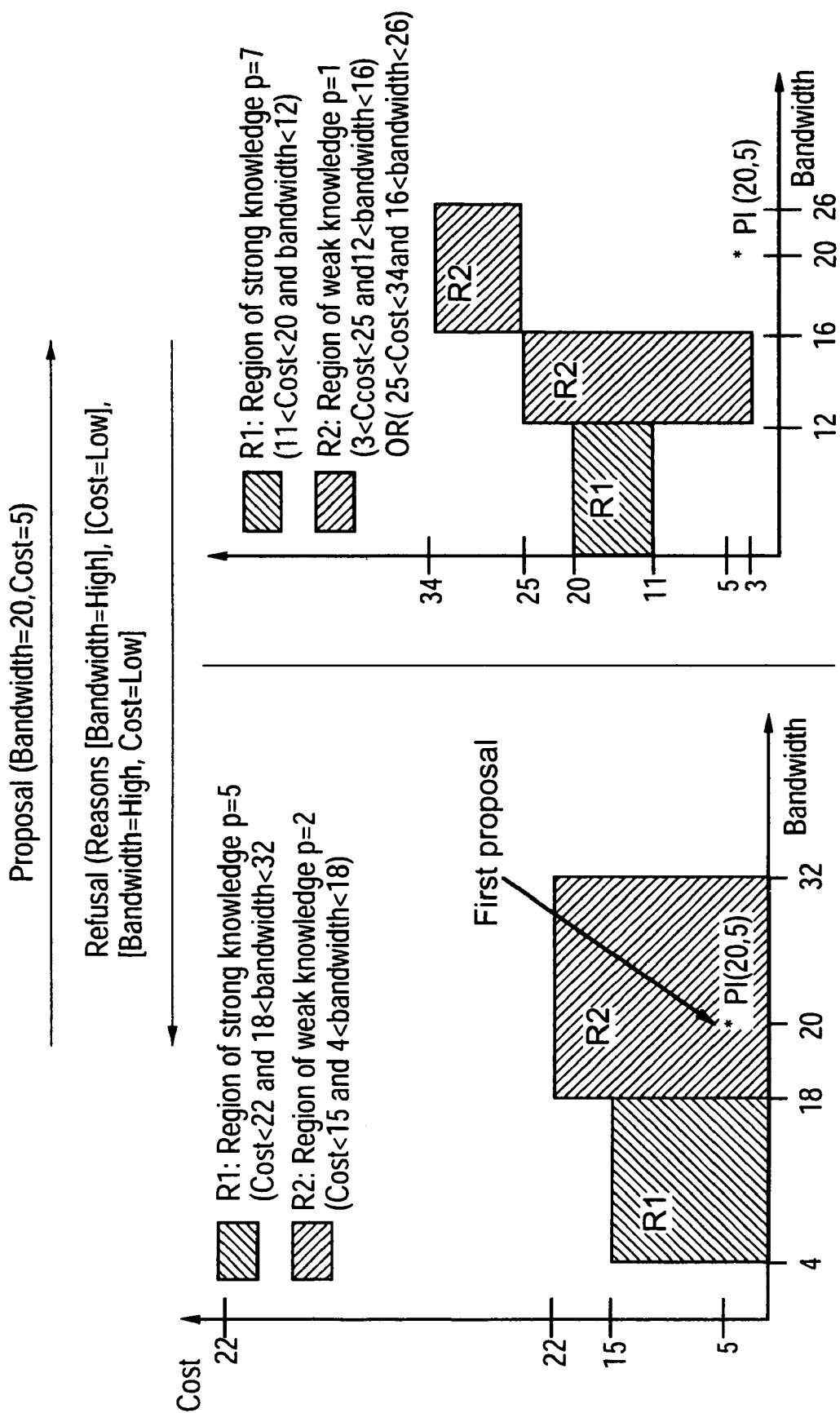

The Video Agent starts by sending a proposal to the authorization server, as discussed in greater detail below. The authorization sever refuses the proposal since it doesn't meet any of its policies, however, it tries to guide the requesting agent to the nearest region (i.e. nearest in the sense of the metric M), which is R2 in the present example (FIG. 12C).

Figure 12D:
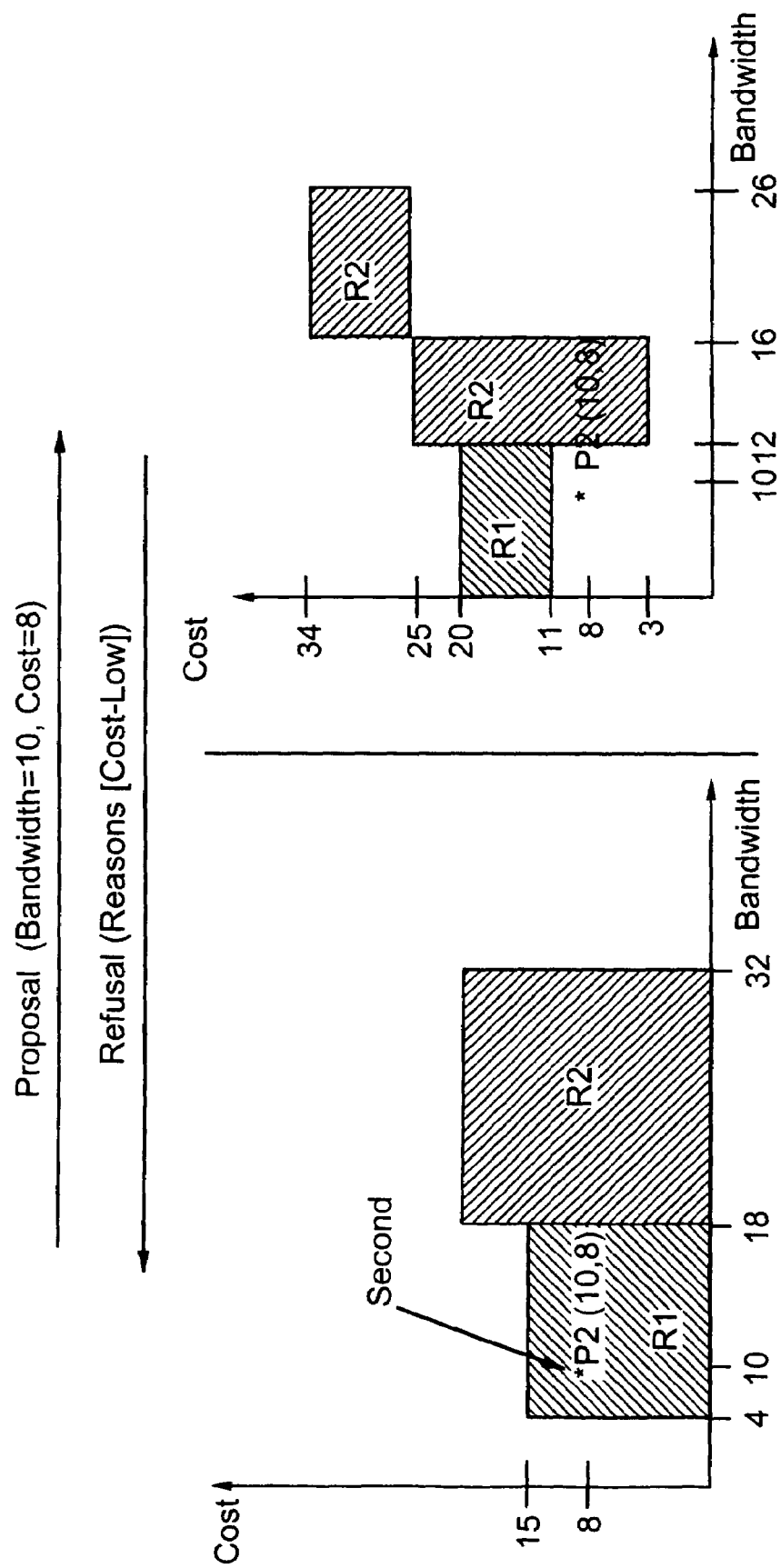

Using the hints provided by the authorization server, the video agent tries to find the best proposal (according to the metric M) that is contained in its regions of knowledge and satisfies the conditions sent by the authorization server. The second proposal is then sent to the authorization server (FIG. 12D). Like the first proposal, the authorization server looks for the nearest region to the proposal, i.e. R1, (the use of the priority term in the formula of measurement makes the region R1 the nearest region to the proposal P2), and tries to guide it to that region. It then sends the response to the video agent.

Figure 12E:
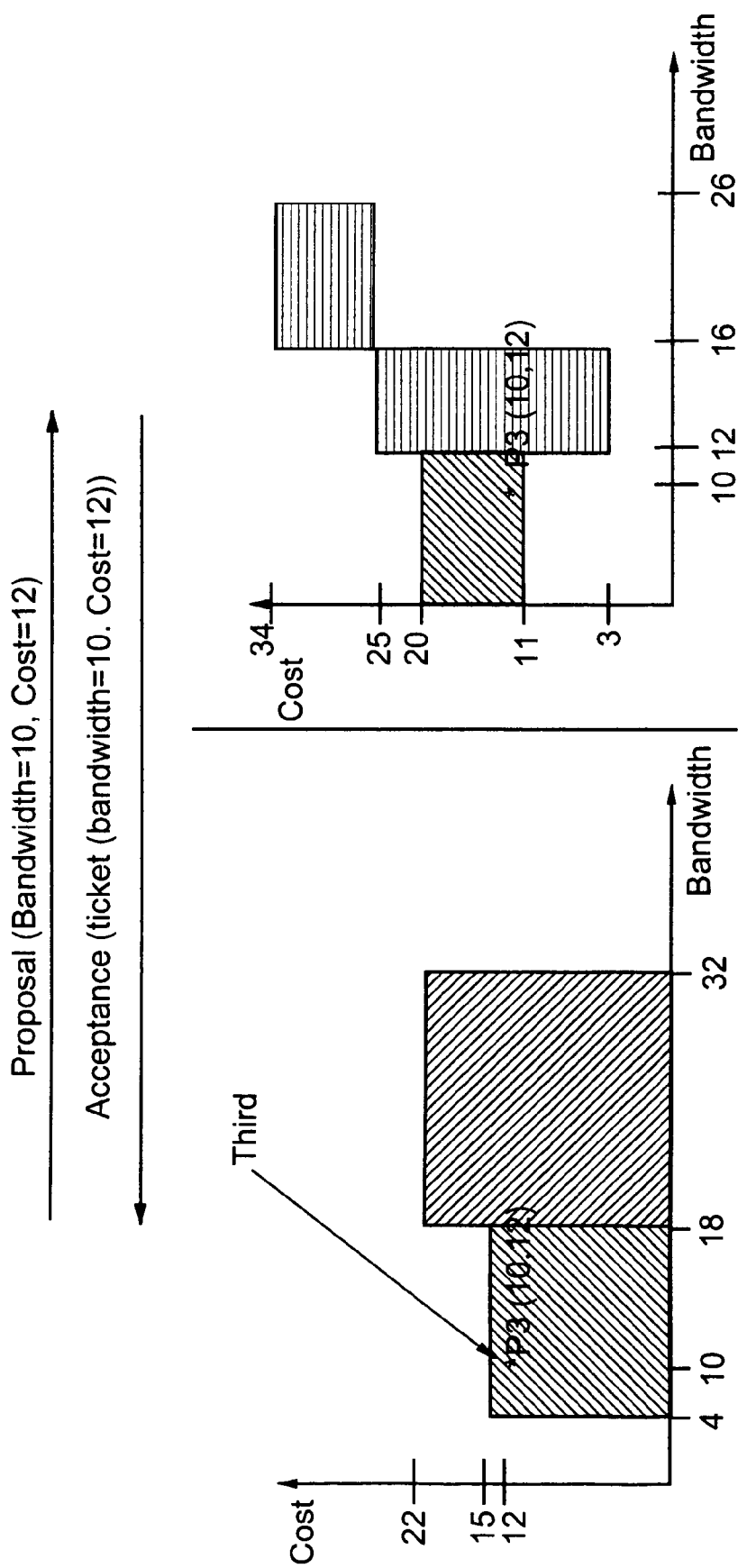

Using the last hint, the video agent looks for a third proposal (FIG. 12E). This time it sends a proposal that gets the agreement of the authorization server, since it does not violate any of its policies.

In summary, the present invention provides a multi-agent architecture for setting up policies in a cooperative network according to different classes based on the activities they monitor. The advantage of this architecture is that it provides a dynamic way to adapt the behavior of agents to any changes in the system. Policies can be quickly setup to control the behavior of agents and make them behave according to the global strategy of the system. Conflicts between agents are detected and resolved through negotiation, as set forth in detail above.

Other embodiments and variations of the invention are possible. For example, it is contemplated that each agent contain it's own private authorization server and policy server for receiving policies from agents or human managers via the appropriate interfaces and deliver the necessary authorizations to the agents. This alternative embodiment eliminates bottleneck delays inherent in using common authorization and policy servers. In this embodiment, each agent manages its own policies and makes decision without referring to a central authority. Appropriate security mechanisms are required in such an embodiment to prevent malicious agents from generating false tickets. This and all such additional embodiments and applications are believed to be within the sphere and scope of the invention as defined by the claims appended hereto.

What is claimed is:

1. A multi-agent for managing system policies on a site operating in one of a plurality of system modes within a virtual network, wherein said system policies include authorization policies for controlling one of either permission or interdiction of actions by an agent, and obligation policies for specifying said actions said agent is responsible for performing, comprising:
   a plurality of service and device agents, at least one of which functions as a requester agent defined by at least one obligation policy, and another of which functions as an executor agent for performing an action requested by said requester agent in order to fulfil said at least one obligation policy;
   an authorization server operating in accordance with said authorization policies for receiving and authenticating requests from said requester agent and in response returning one of either (i) a permission authorization to said requester agent, which in response forwards said permission authorization to said executor agent for performing said action, or (ii) an interdiction to said requester agent for prohibiting said action;
   a policy server for (i) receiving and downloading said obligation policies into said plurality of service and device agents, (ii) for distributing said authorization policies to said authorization server, and (iii) for managing said system policies in accordance with changes in said system modes; and
   an event server for effecting shared communication between plurality of service and device agents.

2. The multi-agent system according to claim 1, wherein said authorization policy is an objection characterized by the following attributes:
   a Mode attribute which is one of either said permission authorization or said interdiction;
   a Subject attribute which specifies which of said agents said authorization policy applies to;
   an Action attribute which specifies a set of operations that said requester agent is authorized to or prohibited from performing, depending on said Mode;
   a Target attribute which specifies said executor agent;
   a Constraint attribute which prohibits return of said permission authorization unless predetermined conditions are verified;
   a Priority attribute which specifies an authority level of said authorization policy relative to other ones of said policies;
   a Class attribute which classifies policies according to a plurality of predetermined system activities to which said authorization policy relates;
   a System mode attribute which represents a predetermined state of said system modes and;
   a Creator attribute which specifies a creator of said authorization responsible for having added said authorization policy to the system.

3. The multi-agent system according to claim 1, wherein said obligation policy is an object characterized by the following attributes:
   a Trigger attribute which specifies one of either an internal or external event for triggering said obligation policy;
   a Subject attribute which specifies which of said agents said obligation policy applies to;
   an Action attribute which specifies a set of operations that said requester agent is authorized to or prohibited from performing, depending on said Mode;
   a Target attribute which specifies said executor agent;
   a Constraint attribute which prohibits return of said permission authorization unless predetermined conditions are verified;
   a Class attribute which classifies policies according to a plurality of predetermined system activities to which said authorization policy relates;
   a System mode attribute which represents a predetermined state of said system modes; and;
   an Exception attribute which specifies an action that said Subject must perform in the event said Subject fails to accomplish said Action.

4. The multi-agent system according to either claim 2 or 3, wherein said plurality of service and device agents further include:
   a site logon agent for authenticating users and opening sessions for said users at said site;
   a coordinator agent for managing inter-agent communications via said event server;
   a site profile agent for mapping user preferences to said obligation policies; and
   a resource agent for managing system resources provided by said plurality of service and device agents.

5. The multi-agent system according to claim 4, wherein said Class attribute defines one of either (i) a class of securities policies which are applied to said coordinator agent, (ii) a class of admission control policies which are applied to said site logon agent, (iii) a class of user profile policies which are applied to said site profile agent, or (iv) a class of resource reservation policies which are applied to said resource agent.

6. The multi-agent system according either one of claim 2 or 3, wherein said Class attribute defines a plurality of classes of policies which are enabled in response to respective ones of said system modes as defined by said System mode attribute.

7. The multi-agent system according to claim 1, further comprising:
   means within at least one of said requester agent and said executor agent for issuing notifications in response to events relating to at least one of an associated service or device; and
   means within said policy server for (i) receiving subscriptions from predetermined ones of said service and device agents to predetermined ones of said events, (ii) receiving said notifications from said at least one of said requester agent and said executor agent, and in response (iii) distributing said notifications to said predetermined ones of said service and device agents.

8. The multi-agent system according to claim 7, wherein said policy server further includes means for enabling and disabling predetermined ones of said system policies upon receiving said notifications from said at least one of said requester agent and said executor agent.

9. In a multi-agent system having a requester agent defined by at least one obligation policy, an executor defined by at least one authorization policy for performing an action requested by said requester agent in order to fulfil said at least one obligation policy, and an authorization server in communication with said requester agent and said executor agent, an action authorization method comprising the steps of:
   sending a request from said requester agent to said authorization server for execution of said action;
   receiving and authenticating said request within said authorization server and in response generating and returning one of either (i) a permission authorization to said requester agent in the event that said obligation policy of said requester agent does not conflict with the authorization policy of said executor agent, or (ii) an interdiction to said requester agent for prohibiting said action in the event that said obligation policy of said requester agent conflicts with the authorization policy of said executor agent; and modifying said request within said requester and sending a resultant modified request to said authorization server in the event that said authorization server previously returned said interdiction; or sending said permission authorization to said executor agent for performing said action in the event said authorization server previously returned said permission authorization, and thereafter sending a confirmation from said executor agent to said requester agent confirming execution of said action.

10. The method of claim 9, further comprising the steps of comparing said request to respective regions of belief of said obligation policy and said authorization policy and in the event that said request is within each of said regions of belief then returning said permission authorization and in the event that said request is outside of as least one of said respective regions of belief then returning said interdiction to said requester along with information indicating reasons for prohibition of said action.

11. The method of claim 10, wherein said step of modifying said request within said requester further comprises interpreting said information and formulating said modified request to more likely be within each of said regions of belief.

12. The multi-agent system according to claim 1, wherein said policy server and authorization server are stand-alone servers accessible to each of said agents within said site.

13. The multi-agent system according to claim 1, wherein each of said agents incorporates its own authorization server and policy server.

14. The multi-agent system of claim 1, wherein said site is a hotel.

* * * * *

UNITED STATES PATENT AND TRADEMARK OFFICE
CERTIFICATE OF CORRECTION

| | | |
|---|---|---|
| PATENT NO. | : 7,240,015 B1 | Page 1 of 1 |
| APPLICATION NO. | : 09/663026 | |
| DATED | : July 3, 2007 | |
| INVENTOR(S) | : Ahmed Karmouch et al. | |

It is certified that error appears in the above-identified patent and that said Letters Patent is hereby corrected as shown below:

Title Page; item (75); should read;

MOUHCINE GUENNOUN

Signed and Sealed this

Eighteenth Day of December, 2007

JON W. DUDAS
*Director of the United States Patent and Trademark Office*